US011606815B2

(12) United States Patent
Sun et al.

(10) Patent No.: US 11,606,815 B2
(45) Date of Patent: Mar. 14, 2023

(54) RANDOM ACCESS CHANNEL TRANSMISSIONS FOR FRAME BASED EQUIPMENT SYSTEMS

(71) Applicant: QUALCOMM Incorporated, San Diego, CA (US)

(72) Inventors: Jing Sun, San Diego, CA (US); Pravjyot Singh Deogun, Bangalore (IN); Xiaoxia Zhang, San Diego, CA (US); Ozcan Ozturk, San Diego, CA (US); Kapil Bhattad, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 16/928,278

(22) Filed: Jul. 14, 2020

(65) Prior Publication Data

US 2021/0022179 A1    Jan. 21, 2021

(30) Foreign Application Priority Data

Jul. 15, 2019    (IN) .............................. 201941028336

(51) Int. Cl.
*H04W 74/08*    (2009.01)
*H04W 16/14*    (2009.01)
(Continued)

(52) U.S. Cl.
CPC ...... *H04W 74/0808* (2013.01); *H04B 17/318* (2015.01); *H04W 16/14* (2013.01);
(Continued)

(58) Field of Classification Search
None
See application file for complete search history.

(56) References Cited

U.S. PATENT DOCUMENTS

2017/0339717 A1    11/2017    Futaki
2018/0048498 A1    2/2018    Stern-Berkowitz et al.
(Continued)

FOREIGN PATENT DOCUMENTS

EP    3432636 A1    1/2019

OTHER PUBLICATIONS

International Search Report and Written Opinion—PCT/US2020/042107—ISA/EPO—dated Sep. 18, 2020.
(Continued)

*Primary Examiner* — Walter J Divito
(74) *Attorney, Agent, or Firm* — Holland & Hart LLP/Qualcomm

(57) ABSTRACT

Methods, systems, and devices for wireless communications are described. The method may include receiving, from a base station over an unlicensed radio frequency spectrum band, a broadcast message including system information, the system information indicating a LBT mode of the base station and a set of random access channel resources associated with a fixed frame period, monitoring a wireless channel of the unlicensed radio frequency spectrum band during the fixed frame period for control information from the base station based on the indicated LBT mode, determining, based on the monitoring, that the base station has access to the wireless channel during the fixed frame period, and performing, based on the determining, a random access channel transmission during the fixed frame period using the set of random access channel resources.

30 Claims, 11 Drawing Sheets

(51) Int. Cl.
  *H04W 56/00* (2009.01)
  *H04W 72/04* (2009.01)
  *H04B 17/318* (2015.01)
  *H04W 76/11* (2018.01)
  *H04W 68/00* (2009.01)
  *H04W 24/08* (2009.01)

(52) U.S. Cl.
  CPC ......... *H04W 24/08* (2013.01); *H04W 56/001* (2013.01); *H04W 68/005* (2013.01); *H04W 72/042* (2013.01); *H04W 74/0891* (2013.01); *H04W 76/11* (2018.02)

(56) References Cited

U.S. PATENT DOCUMENTS

| | | |
|---|---|---|
| 2018/0255578 A1 | 9/2018 | Kim et al. |
| 2019/0116615 A1 | 4/2019 | Harada et al. |
| 2020/0053779 A1 | 2/2020 | Jeon et al. |
| 2020/0137596 A1* | 4/2020 | Oh ........................ H04W 56/001 |
| 2020/0281018 A1* | 9/2020 | Li .......................... H04L 5/0051 |
| 2021/0298072 A1* | 9/2021 | Oh ..................... H04W 72/0446 |

OTHER PUBLICATIONS

Qualcomm Incorporated: "Channel Access Procedures for NR Unlicensed", 3GPP Draft, 3GPP TSG RAN WG1 Meeting #AH1901, R1-1900873 Channel Access Procedures for NR Unlicensed, 3rd Generation Partnership Project (3GPP), Mobile Competence Centre, 650, Route Des Lucioles, F-06921 Sophia-Antipolis Cedex, Fra vol. RAN WG1, No. Taipei, Taiwan, Jan. 21, 2019-Jan. 25, 2019 Jan. 20, 2019 (Jan. 20, 2019), XP051593719, 13 Pages, Retrieved from the Internet: URL:http://www.3gpp.org/ftp/Meetings%5F3GPP%5FSYNC/RAN1/Docs/R1%2D1900873%2Ezip [retrieved on Jan. 20, 2019] paragraph [0003], paragraph [04.1], paragraph [0005].

* cited by examiner

RANDOM ACCESS CHANNEL TRANSMISSIONS FOR FRAME BASED EQUIPMENT SYSTEMS

CROSS REFERENCE

The present application for patent claims the benefit of Indian Provisional Patent Application No. 2019/41028336 by SUN et al., entitled "RANDOM ACCESS CHANNEL TRANSMISSIONS FOR FRAME BASED EQUIPMENT SYSTEMS," filed Jul. 15, 2019, assigned to the assignee hereof, and expressly incorporated by reference herein.

BACKGROUND

The following relates generally to wireless communications, specifically to random access channel transmissions for frame based equipment systems, and more specifically to random access channel transmission using resources associated with a fixed frame period.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may use random access channel procedures to establish a connection with a base station

SUMMARY

The described techniques relate to improved methods, systems, devices, and apparatuses that support random access channel transmissions for frame based equipment systems. Generally, the described techniques provide for a UE in a mobile wireless network monitoring broadcast signaling (e.g., broadcast messages) from a base station. In some cases, the UE may receive an indication in broadcast signaling for a frame that indicates to the UE an operating mode of the base station. For example, the indication may indicate whether the base station is operating in a frame base equipment (FBE) mode or load base equipment (LBE) mode. In some cases, the UE may select a channel access procedure for transmissions related to a random access channel procedure based on the determined operating mode of the base station. A channel access procedure is a procedure based on sensing that evaluates the availability of a channel for performing transmissions, for example, random access channel transmissions.

A method of wireless communications by a first UE is described. The method may include receiving, from a base station over an unlicensed radio frequency spectrum band, a broadcast message including system information, the system information indicating a listen before talk (LBT) mode of the base station and a set of random access channel resources associated with a fixed frame period, monitoring a wireless channel of the unlicensed radio frequency spectrum band during the fixed frame period for control information from the base station based on the indicated LBT mode, determining, based on the monitoring, that the base station has access to the wireless channel during the fixed frame period, and performing, based on the determining, a random access channel transmission during the fixed frame period using the set of random access channel resources.

An apparatus for wireless communications by a first UE is described. The apparatus may include a processor, memory coupled with the processor, and instructions stored in the memory. The instructions may be executable by the processor to cause the apparatus to receive, from a base station over an unlicensed radio frequency spectrum band, a broadcast message including system information, the system information indicating a LBT mode of the base station and a set of random access channel resources associated with a fixed frame period, monitor a wireless channel of the unlicensed radio frequency spectrum band during the fixed frame period for control information from the base station based on the indicated LBT mode, determine, based on the monitoring, that the base station has access to the wireless channel during the fixed frame period, and perform, based on the determining, a random access channel transmission during the fixed frame period using the set of random access channel resources.

Another apparatus for wireless communications by a first UE is described. The apparatus may include means for receiving, from a base station over an unlicensed radio frequency spectrum band, a broadcast message including system information, the system information indicating a LBT mode of the base station and a set of random access channel resources associated with a fixed frame period, monitoring a wireless channel of the unlicensed radio frequency spectrum band during the fixed frame period for control information from the base station based on the indicated LBT mode, determining, based on the monitoring, that the base station has access to the wireless channel during the fixed frame period, and performing, based on the determining, a random access channel transmission during the fixed frame period using the set of random access channel resources.

A non-transitory computer-readable medium storing code for wireless communications by a first UE is described. The code may include instructions executable by a processor to receive, from a base station over an unlicensed radio frequency spectrum band, a broadcast message including system information, the system information indicating a LBT mode of the base station and a set of random access channel resources associated with a fixed frame period, monitor a wireless channel of the unlicensed radio frequency spectrum band during the fixed frame period for control information from the base station based on the indicated LBT mode, determine, based on the monitoring, that the base station has access to the wireless channel during the fixed frame period, and perform, based on the determining, a random access channel transmission during the fixed frame period using the set of random access channel resources.

Some examples of the method, apparatuses, and non-transitory computer-readable medium described herein may further include operations, features, means, or instructions for receiving, based on the monitoring, a synchronization signal block transmission, where determining that the base station may have access to the wireless channel may be based on the synchronization signal block transmission.

Some examples of the method, apparatuses, and non-transitory computer-readable medium described herein may further include operations, features, means, or instructions for determining a signal strength of the synchronization signal block transmission, where performing the random access channel transmission may be based on the determined signal strength of the synchronization signal block transmission satisfying a threshold.

Some examples of the method, apparatuses, and non-transitory computer-readable medium described herein may further include operations, features, means, or instructions for receiving, based on the monitoring, additional system information during the fixed frame period, where performing the random access channel transmission may be based on the additional system information.

Some examples of the method, apparatuses, and non-transitory computer-readable medium described herein may further include operations, features, means, or instructions for receiving a downlink grant based on a system information radio network temporary identifier associated with the additional system information, where performing the random access channel transmission may be based on the downlink grant.

Some examples of the method, apparatuses, and non-transitory computer-readable medium described herein may further include operations, features, means, or instructions for determining whether a frame of the fixed frame period includes a paging message or a downlink control information including a paging radio network temporary identifier, where performing the random access channel transmission may be based on whether the frame includes the paging message or the downlink control information.

In some examples of the method, apparatuses, and non-transitory computer-readable medium described herein may further include operations, features, means, or instructions for identifying a paging window based on one or more of: an identifier of the UE or an identifier of the base station, where receiving the paging message or the downlink control information may be based on the paging window.

In some examples of the method, apparatuses, and non-transitory computer-readable medium described herein may further include operations, features, means, or instructions for receiving, based on the monitoring, one or more of: a random access response or a downlink control information including a random access radio network temporary identifier, where determining that the base station may have access to the wireless channel may be based on the random access response or the downlink control information.

In some examples of the method, apparatuses, and non-transitory computer-readable medium described herein, the random access response or the downlink control information may be directed to a recipient other than the UE.

Some examples of the method, apparatuses, and non-transitory computer-readable medium described herein may further include operations, features, means, or instructions for determining whether a frame of the fixed frame period includes a physical downlink control channel with a placeholder radio network temporary identifier, where performing the random access channel transmission may be based on whether the frame includes the physical downlink control channel with the placeholder radio network temporary identifier.

In some examples of the method, apparatuses, and non-transitory computer-readable medium described herein, the monitoring further may include operations, features, means, or instructions for detecting the physical downlink control channel with the placeholder radio network temporary identifier in a search space of a frame of the fixed frame period, where the search space of the frame includes one or more of: a system information search space or a paging search space.

Some examples of the method, apparatuses, and non-transitory computer-readable medium described herein may further include operations, features, means, or instructions for determining whether the fixed frame period includes a demodulation reference signal, where performing the random access channel transmission may be based on whether the frame includes the demodulation reference signal.

Some examples of the method, apparatuses, and non-transitory computer-readable medium described herein may further include operations, features, means, or instructions for determining a signal strength of the demodulation reference signal, where performing the random access channel transmission may be based on the determined signal strength of the demodulation reference signal satisfying a threshold.

Some examples of the method, apparatuses, and non-transitory computer-readable medium described herein may further include operations, features, means, or instructions for determining a validity of resources associated with the random access channel transmission based on a duration associated with a frame of the fixed frame period.

Some examples of the method, apparatuses, and non-transitory computer-readable medium described herein may further include operations, features, means, or instructions for performing the random access channel transmission after the UE processes the broadcast message, where the broadcast message may be transmitted in a first slot, and where the UE processes the broadcast message in one or more slots subsequent to the first slot.

Some examples of the method, apparatuses, and non-transitory computer-readable medium described herein may further include operations, features, means, or instructions for selecting, via a media access control layer of the UE, resources available in a frame of the fixed frame period for the random access channel transmission, and indicating, via the media access control layer, the selected resources to a physical layer of the UE, where the UE detects the broadcast message via the physical layer.

Some examples of the method, apparatuses, and non-transitory computer-readable medium described herein may further include operations, features, means, or instructions for determining, via the physical layer, a validity of the selected resources, where performing the random access channel transmission may be based on the determined validity of the selected resources.

Some examples of the method, apparatuses, and non-transitory computer-readable medium described herein may further include operations, features, means, or instructions for indicating an LBT failure to the media access control layer when the selected resources are determined to be invalid.

Some examples of the method, apparatuses, and non-transitory computer-readable medium described herein may further include operations, features, means, or instructions for determining, based on the broadcast message and the fixed frame period or a frame of the fixed frame period, a validity of the random access channel resources, where performing the random access channel procedure may be based on the validity of the random access channel resources.

Some examples of the method, apparatuses, and non-transitory computer-readable medium described herein may further include operations, features, means, or instructions for sending an indication of the validity of the random access channel resources from a physical layer of the UE to a media access control layer of the UE.

Some examples of the method, apparatuses, and non-transitory computer-readable medium described herein may further include operations, features, means, or instructions for entering a low-power state or sleep state based on determining a frame of the fixed frame period does not include at least one broadcast signal, where the UE may treat resources available in the frame for the random access channel transmission as invalid based on determining the frame does not include the at least one broadcast message.

In some examples of the method, apparatuses, and non-transitory computer-readable medium described herein, the system information includes a configuration to monitor a group common physical downlink control channel, and where determining the base station may be operating in the LBT mode may be based on the configuration to monitor the group common physical downlink control channel.

In some examples of the method, apparatuses, and non-transitory computer-readable medium described herein, the system information includes a configuration to use a category-2 LBT for the random access channel transmission, where determining the base station may be operating in the LBT mode may be based on the configuration to use the category-2 LBT for the random access channel transmission.

In some examples of the method, apparatuses, and non-transitory computer-readable medium described herein, the system information includes an indication that the base station may be operating in the LBT mode.

Some examples of the method, apparatuses, and non-transitory computer-readable medium described herein may further include operations, features, means, or instructions for receiving an authentication management message associated with a registration procedure, where determining the base station may be operating in the LBT mode may be based at least in part the authentication management message.

In some examples of the method, apparatuses, and non-transitory computer-readable medium described herein, the LBT mode includes a frame based equipment (FBE) LBT mode, and the system information includes a first list of cells operating in the FBE mode and a second list of cells operating in a load based equipment (LBE) mode.

Some examples of the method, apparatuses, and non-transitory computer-readable medium described herein may further include operations, features, means, or instructions for applying a cell reselection priority to camp either on the cells operating in FBE mode or on the cells operating in the LBE mode.

DETAILED DESCRIPTION

Figure 1:
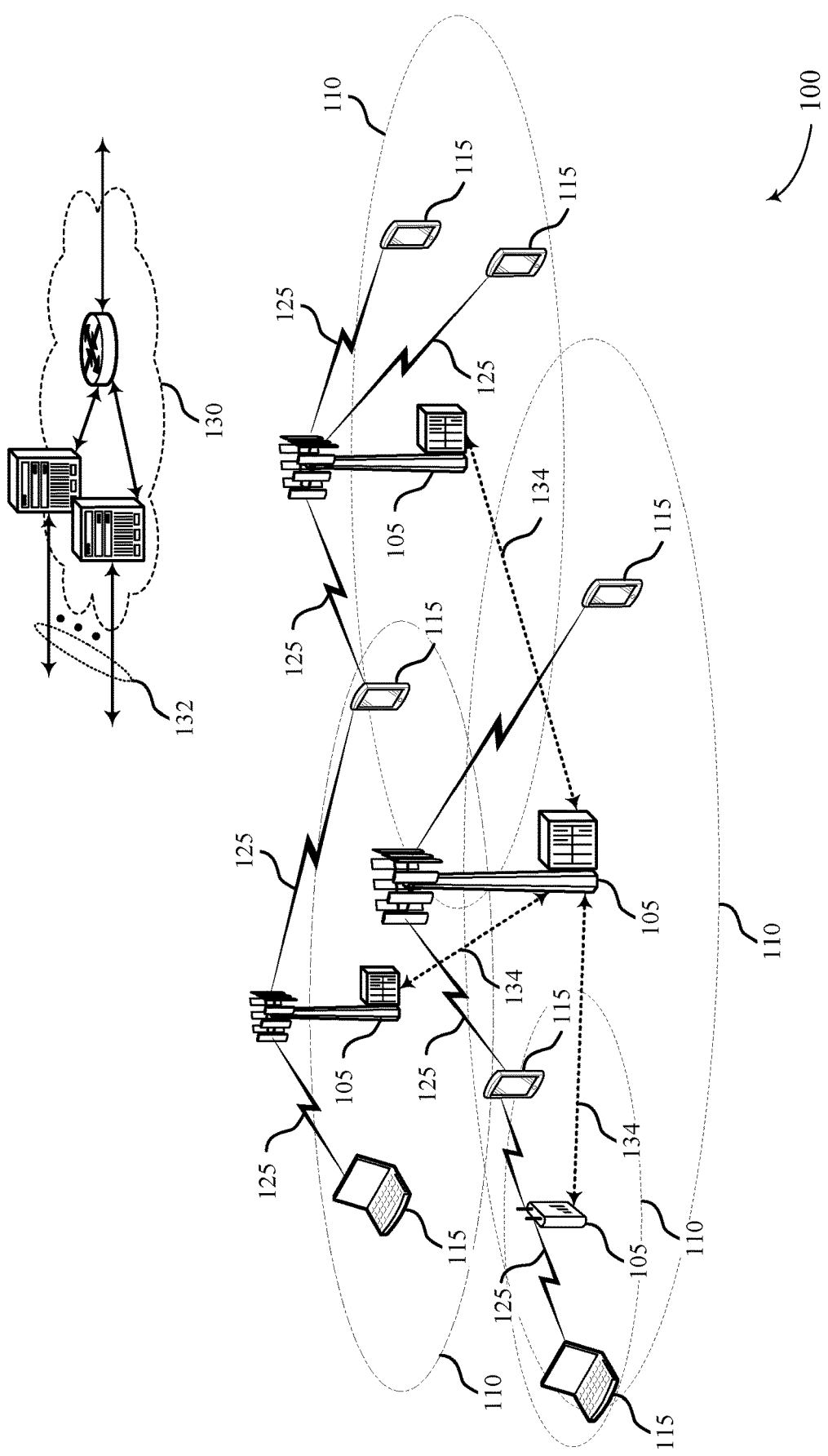
FIG. 1 illustrates an example of a system for wireless communications that supports random access channel transmissions using resources associated with a fixed frame period in accordance with aspects of the present disclosure.

The present techniques relate to random access channel transmissions for frame based equipment (FBE) systems, more specifically to random access channel transmissions using resources associated with a fixed frame period. FBE systems include wireless devices operating in an unlicensed radio frequency spectrum band in a FBE mode, for instance, a FBE base station. In some cases, a UE in a wireless cellular network may implement the present techniques to determine whether a serving cell base station has acquired access to a wireless channel of the unlicensed radio frequency spectrum band in a certain frame during a fixed frame period when operating in the FBE mode.

Wireless devices operating in unlicensed radio frequency spectrum band may support one or more of load based equipment (LBE) mode and FBE mode. In FBE systems, a timeline may be divided into frames of a certain duration (e.g., fixed frame period (FFP)). The FFP may be configured on a system level and can be, for instance, between 1 and 10 ms. Although advantageous for deployment reasons, presently there exists no system constraint requiring the duration of the fixed frame period (FFP) in a FBE system to correspond to the duration of a (radio) frame of the serving cell based station.

For example, in FBE systems, channel sensing may be performed by a FBE base station at fixed time instances, for instance before starting a transmission in the channel at the beginning of a FFP duration. When the channel is busy, the FBE base station may back-off for at least one FFP and attempt to sense the channel again after the at least one FFP lapses. In LBE systems, the channel sensing may be performed at any time instant and a random back-off may be used when the channel is busy. A serving cell base station may operate in the FBE mode in an unlicensed radio frequency spectrum band for use cases in which LBE systems are excluded such as, for instance, in a factory or private networks.

In some cases, a base station operating in an FBE mode may perform a category-2 (Cat-2) listen-before-talk (LBT) procedure before each frame to acquire a channel occupancy time (COT) for an FFP duration. A UE may be unable to connect to the base station via a random access channel transmission during a fixed fame period if the base station has not successfully acquired a COT for that fixed frame period. Accordingly, in some cases, a UE attempting to connect to a base station in an FBE system may first assess whether a frame is occupied by a serving cell or a neighbor cell before initiating the random access channel procedure during that (same) fixed frame period. Initiating the random access procedure may include the UE to perform a random access channel transmission, namely the transmission of RACH message 1 over the physical random access channel (PRACH) during the fixed frame period.

To make this determination, a UE may monitor downlink signals from the serving cell base station, such as a group common physical downlink control channel. In some examples, for monitoring a group common physical downlink control channel (GC-PDCCH), a UE may be configured in remaining minimum system information (RMSI) broadcast by the base station at regular intervals or through UE-specific radio resource control (RRC) signaling. In some cases, the RMSI may indicate a COT structure of the base station, assisting the UE to perform the random access procedure. The UE may monitor GC-PDCCH to determine whether a frame configured with random access channel resources is occupied by the serving cell base station.

As an addition or alternative to existing GC-PDCCH monitoring techniques, the techniques described herein may allow a UE detecting broadcast and other control signal transmissions in unlicensed radio frequency spectrum band from a base station to initiate a random access channel procedure. In some cases, with initial access the UE may not have the configuration to monitor broadcast signals the GC-PDCCH. Accordingly, the present techniques may include configuring random access channel (RACH) resources indicated via system information, the RACH resources being configured in the same fixed frame period in that a broadcast signal is transmitted by the serving cell base station.

In some cases, the present techniques may include configuring the RACH resources using an indication provided through system information of a broadcast message. In one example, the system information indicating RACH resources may be a minimum system information, such as the master information block (MIB). In some cases, the broadcast message may be periodically broadcast on a physical broadcast channel (PBCH), and may comprise physical layer information of the cell required for the UEs to receive additional system information, such as the remaining minimum system information (RMSI). In some cases, the master information block (MIB) includes a system frame number (SFN) parameter which may indicate the random access channel (RACH) resources.

In some cases, the present techniques may include the UE determining whether the serving cell base station is operating in FBE mode or LBE mode. In one example, the UE may determine the serving cell base station is operating in FBE mode when the serving cell base station requires GC-PDCCH monitoring to initiate a random access procedure. For example, the serving cell base station may require that the UE receive GC-PDCCH before initiating a random access procedure. In one example, the UE may determine the serving cell base station is operating in FBE mode when RMSI (e.g. SIB1) indicates the base station is a FBE base station. In some cases, the RMSI may indicate a configuration of the FFP. In some cases, for physical RACH (PRACH) transmissions in an FBE system, the UE may be configured to perform Cat-2 LBT (as opposed to Cat-4 LBT used in LBE systems). Accordingly, in one example the UE may determine the serving cell base station is operating in FBE mode when a random access channel (RACH) configuration indicates to use Cat-2 LBT. In some examples, the UE may determine the serving cell base station is operating in FBE mode based on information the UE receives from access management function (AMF) during a registration procedure.

In some cases, each cell of a given network (e.g., public land mobile network (PLMN)) may operate in unlicensed radio frequency spectrum band in either LBE mode or FBE mode. When each cell of a PLMN may be either FBE or LBE based cell, the network may specify a first set of UEs to camp on FBE based cells and a second set of UEs to camp on LBE based cells. In one example, UEs configured for industrial Internet-of-things (IoT) may be assigned to camp on FBE based cells. In one example, one or more base stations or all base stations of a PLMN may broadcast neighbor cell information that includes a first list of cells in the PLMN operating in FBE mode and a second list of cells in the PLMN operating in LBE mode. Based on the received neighbor cell information, a UE may apply cell reselection priority to camp either on FBE based cells or LBE based cells.

Aspects of the disclosure are initially described in the context of a wireless communications system. Aspects of the disclosure are also described in the context of wireless communication subsystems and a timeline associated with wireless communications systems. Aspects of the disclosure are further illustrated by and described with reference to apparatus diagrams, system diagrams, and flowcharts that relate to random access channel transmissions for frame based equipment systems, more specifically to random access channel transmissions using resources associated with a fixed frame period.

FIG. 1 illustrates an example of a wireless communications system 100 that supports random access channel transmissions using resources associated with a fixed frame period in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band (NR-U) such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In one example, a device (e.g., UE 115 or base station 105) may receive a broadcast message that includes system information. In some cases, the broadcast message may be received over an unlicensed radio frequency spectrum band. In some cases, the system information may indicate a listen-before-talk (LBT) mode of a base station. In some examples, the LBT mode may be or include a FBE mode or semi-static channel access mode. In some cases, the system information may indicate a set of random access channel resources associated with a fixed frame period. In some examples, the device may monitor, during a particular fixed frame period, a wireless channel of the unlicensed radio frequency spectrum band for control information from the base station based at least in part on the indicated LBT mode. In some cases, the device may determine, based on the monitoring, that the base station has access to the wireless channel during the fixed frame period. In some examples, the device may perform, based at least in part on the determining, a random access channel transmission during the fixed frame period using the set of random access channel resources.

The present techniques provide several advantages over conventional systems. For example, by enabling a UE to determine when a base station has acquired access to a certain frame, the present techniques enable faster connection attempts to the base station compared to conventional systems at initial access because these techniques enable the UE to determine when precisely to attempt performing a random access channel transmission. Also, the present techniques provide an improved conservation of resources compared to conventional systems because the present techniques enable the UE to determine a set of random access channel resources associated with a specific frame or a specific fixed frame period of a frame to which the base station has acquired access.

Figure 2:
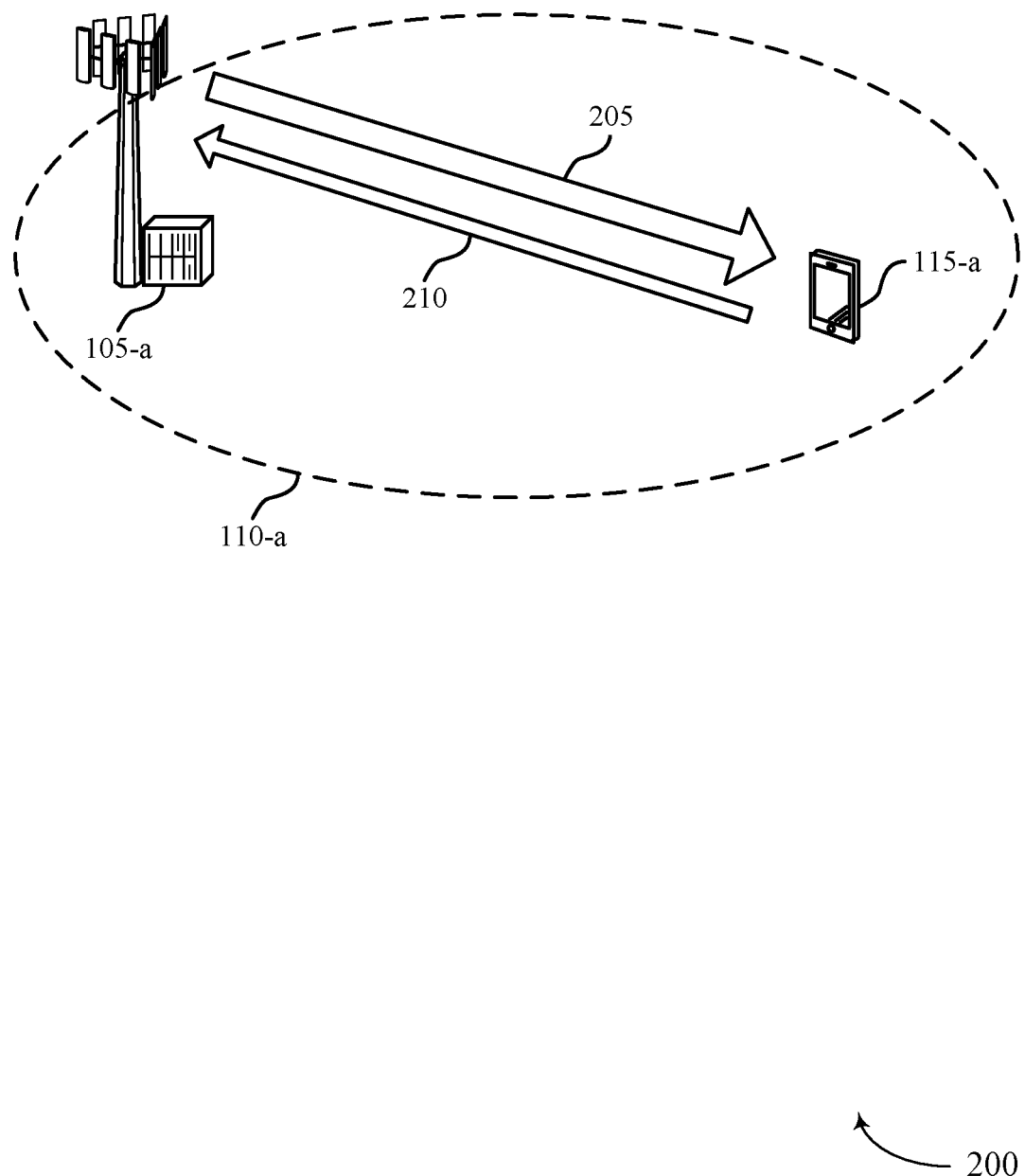
FIG. 2 illustrates an example of a wireless communication subsystem that supports random access channel transmissions using resources associated with a fixed frame period in accordance with aspects of the present disclosure.

FIG. 2 illustrates an example of a wireless communication subsystem 200 that supports random access channel transmissions using resources associated with a fixed frame period in accordance with aspects of the present disclosure. In some examples, wireless communication subsystem 200 may implement aspects of wireless communication system 100. In some examples, the wireless communications subsystem 200 may include a mobile services network. In some cases, wireless communications subsystem 200 may coexist with a fixed services network.

As illustrated, wireless communications subsystem 200 may include UE 115-*a* and base station 105-*a* in a geographic coverage area 110-*a*, which may be examples of a UE 115 or a base station 105 or geographic coverage area 110, as described herein with reference to FIG. 1. Wireless communications subsystem 200 may also include downlink 205 and uplink 210. Base station 105-*a* may use downlink 205 to convey control and/or data information to UE 115-*a*. And UE 115-*a* may use uplink 210 to convey control and/or data information to base station 105-*a*. In some cases, downlink 205 may use different time and/or frequency resources than uplink 210.

In some examples, base station 105-*a* may generate a message that includes system information. In some cases, base station 105-*a* may transmit the generated message to UE 115-*a* (e.g., via downlink 205). In some cases, base station 105-*a* may transmit the message over an unlicensed radio frequency spectrum band. In some cases, base station 105-*a* may broadcast the message. In one example, base station 105-*a* may broadcast the message over an unlicensed radio frequency spectrum band.

In some examples, UE 115-*a* may receive the message from base station 105-*a*. In some cases, UE 115-*a* may receive the message over an unlicensed radio frequency spectrum band. In some cases, UE 115-*a* may identify system information in the message. In some cases, the system information may indicate a listen-before-talk (LBT) mode of base station 105-*a*. In some examples, the LBT mode may be or include a FBE mode or semi-static channel access mode. In some cases, the system information may indicate a set of random access channel resources associated with a fixed frame period.

In some cases, UE 115-*a* may monitor a wireless channel of the unlicensed radio frequency spectrum band during the fixed frame period for control information from the base station 105-*a* based at least in part on the indicated LBT mode.

In some cases, UE 115-*a* may determine, based on the monitoring, whether base station 105-*a* has access to the wireless channel during the fixed frame period. In some cases, UE 115-*a* may receive an indication from base station 105-*a* that indicates base station 105-*a* has access to the wireless channel during the fixed frame period. In one example, UE 115-*a* may receive a synchronization signal block (SSB) transmission and determine that the base station 105-*a* has access to the wireless channel during the fixed frame period based at least in part on receiving the SSB.

In one example, UE 115-*a* may receive additional system information and determine that the base station 105-*a* has access to the wireless channel during the fixed frame period based at least in part on receiving the additional system information from base station 105-*a*. Examples of additional system information may include remaining minimum system information (RMSI) or a system information block (SIB) received by UE 115-*a* during the fixed frame period in which UE 115-*a* receives the message from base station 105-*a*.

In one example, UE 115-*a* may receive downlink control information (DCI) that includes a system information radio network temporary identifier (SI-RNTI) and determine that the base station 105-*a* has access to the wireless channel during the fixed frame period based at least in part on receiving the DCI that includes SI-RNTI from base station 105-*a*. For example, the DCI may carry a downlink grant and include a CRC field which is scrambled with the SI-RNTI. In some cases, the downlink grant may schedule a broadcast signal transmission of other system information, such as a system information block (SIB) not included in the RMSI (e.g., not SIB1).

In one example, UE 115-*a* may receive a paging message and determine that the base station 105-*a* has access to the wireless channel during the fixed frame period based at least in part on receiving the paging message from base station 105-*a*. In some cases, the paging message may include one or more of: a physical downlink control channel (PDCCH) paging message or a physical downlink shared channel (PDSCH) paging message.

In one example, UE 115-*a* may receive downlink control information (DCI) that includes a paging radio network temporary identifier (P-RNTI) and determine that the base station 105-*a* has access to the wireless channel during the fixed frame period based at least in part on receiving the P-RNTI from base station 105-*a*. For example, the DCI may carry a downlink grant and include a CRC field which is scrambled with the P-RNTI. In some cases, the downlink grant may schedule a paging message for paging plural UEs.

In one example, UE 115-*a* may receive a random access response (RAR) and determine that the base station 105-*a* has access to the wireless channel during the fixed frame period based at least in part on receiving the random access response from base station 105-*a*.

In one example, UE 115-*a* may receive from base station 105-*a* a downlink control information (DCI) that includes a random access radio network temporary identifier (RA-RNTI) and determine that the base station 105-*a* has access to the wireless channel during the fixed frame period based at least in part on receiving the DCI that includes the RA-RNTI. For example, the DCI may carry a downlink grant and include a CRC field which is scrambled with the RA-RNTI. In some cases, the downlink grant may schedule a downlink shared channel transmission of a random access response (RA message 2).

In one example, UE 115-*a* may receive placeholder physical downlink control channel (PDCCH) from base station 105-*a* and determine that the base station 105-*a* has access to the wireless channel during the fixed frame period based at least in part on receiving the placeholder PDCCH. Examples of the placeholder PDCCH may include an empty PDCCH or "dummy" PDCCH, or an empty RNTI message. A placeholder PDCCH message may include a PDCCH with minimal information (e.g., a PDCCH without explicit configuration for a PDCCH search space). In one example, the placeholder PDCCH may indicate coarse structure indication of the channel occupancy time. In some cases, the placeholder PDCCH may use the same search space as used, for example, by a RMSI transmissions or a paging transmissions, and base station 105-a may not provide additional search space configuration for the placeholder PDCCH.

Accordingly, UE 115-a may determine that the base station has access to the wireless channel during the fixed frame period based at least in part on receiving system information from the base station. In one example, UE 115-a may perform, based on the determining, a random access channel transmission during the fixed frame period. In some cases, UE 115-a performing the random access channel transmission during the fixed frame period may include UE 115-a using the set of random access channel resources associated with the fixed frame period and indicated in the system information in the message received from base station 105-a.

Figure 3:
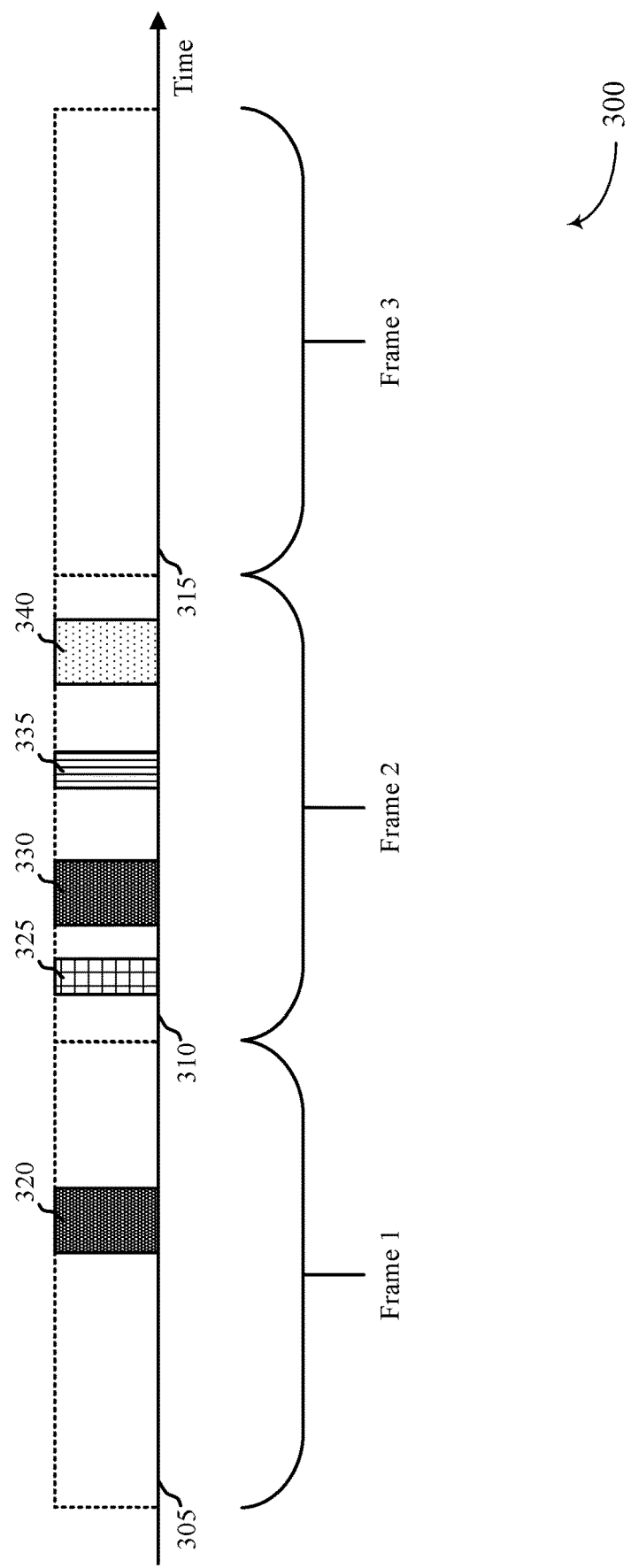
FIG. 3 illustrates an example of a timeline that supports random access channel transmissions using resources associated with a fixed frame period in accordance with aspects of the present disclosure.

FIG. 3 illustrates an example of a timeline 300 that supports random access channel transmissions using resources associated with a fixed frame period in accordance with aspects of the present disclosure. In some examples, timeline 300 may implement aspects of wireless communication system 100 or wireless communications subsystem 200.

In FBE systems, a timeline may be divided into frames of a fixed duration or fixed frame period (FFP). In one example, timeline 300 is an example of a timeline associated with an FBE system. As shown, timeline 300 includes frames 305, 310, and 315. In some cases, any one of frames 305, 310, or 315 may be frames of an FBE system (e.g., frames associated with a serving base station operating in an FBE mode). In some cases, a duration of any one of frame 305, frame 310, or frame 315 may be an FFP duration. In one example, frame 310 is an example of a frame acquired by a serving base station (e.g., base station 105 of FIG. 1 or FIG. 2), while frames 305 and 315 may be examples of frames not acquired by the serving base station.

In some examples, a base station (e.g. base station 105) may broadcast over an unlicensed radio frequency spectrum band, in a frame other than frames 305, 310, and 315 shown in FIG. 3, a broadcast message comprising system information. In one example, a UE (e.g., a UE 115) may receive this system information. From the system information, the UE may infer a LBT-mode which the base station may use for acquiring channel access. In one example, the indicated LBT mode may correspond to a category-2 (Cat-2) LBT. The system information may also indicate to the UE a set of random access channel resources for uplink transmissions. In one example, the indicated RACH resources may be associated with one or more fixed frame periods, for example, frames 305 and 310 (e.g. RACH occasions 320, 330 and 340). The system information broadcast message may indicate RACH resources independent of whether the base station successfully acquires the channel during the associated one or more fixed frame periods.

In some examples, the base station may perform a category-2 (Cat-2) listen before talk (LBT) before at least one, preferably each of frames 305, 310, or 315. In one example, the UE may monitor a downlink signal received from a base station in at least one frame (e.g., frame 305, or frame 310, or frame 315) to initiate an uplink transmission in that particular frame. In some cases, a frame may not include any downlink signal from the base station, for example, a scheduled broadcast signal transmission of additional system information. In some cases, the UE may determine that the base station does not have access to the wireless channel, when a frame with configured RACH resources does not include a broadcast signal. Then, the UE may bypass performing a RACH transmission. In some cases, the UE may enter a low-power state or sleep state when the UE determines that a frame with configured RACH resources does not include a broadcast signal.

As shown, frame 305 may include random access channel resources configured by the network (e.g., RACH occasion 320). However, as shown frame 305 may not include a broadcast signal from a base station that is scheduled for transmission during frame 305. Accordingly, a UE may treat the resources of frame 305 as invalid. In some cases, a UE may treat RACH occasion 320 in frame 305 as an invalid RACH occasion because the UE did not receive any broadcast signal from a base station during frame 305. In some cases, when a UE determines frame 305 does not include a broadcast signal, to save power the UE may be configured to go to sleep at least until the end of frame 305. In some cases, when a frame does not include a downlink signal (e.g., frame 305), then the configuration of the UE may not permit the UE to perform a random access channel transmission.

As shown, frame 310 may include RACH resources in RACH occasion 330 and RACH occasion 340. When RACH resources are available in a particular frame (e.g., frame 310), then a base station may transmit a downlink signal at least at the beginning of that frame. As shown, a base station may transmit a broadcast signal 325. However, in the illustrated example the UE may fail to receive the broadcast signal 325. As a result, the UE may not be permitted to use RACH resources associated with RACH occasion 330. However, in the illustrated example the UE may receive the broadcast signal 335. As a result, the UE may be permitted to use RACH resources associated with RACH occasion 340. In some cases, the UE may use the RACH resources associated with RACH occasion 340 to perform a random access channel transmission as part of a random access procedure.

Accordingly, in the illustrated example the UE may select RACH resources of RACH occasion 340 in conjunction with initiating an uplink transmission in frame 310. When the UE detects broadcast signal 335 from a serving base station, the UE may process broadcast signal 335 (e.g., processing information in broadcast signal 335). In some cases, the UE may determine that frame 310 is occupied by the serving base station based on the processing of broadcast signal 335. In some cases, the UE may determine the duration of the frame 310 based on the processing of broadcast signal 335. For example, the duration of frame 310 may be indicated by a RMSI in broadcast signal 335. In some cases, the UE may determine, based on the processing of broadcast signal 335, whether there are any RACH resources available in frame 310 (e.g., RACH resources in RACH occasion 340).

In some cases, after the UE detects broadcast signal 335 there may be a certain processing delay for the UE to process broadcast signal 335. In one example, broadcast signal 335 may be transmitted in a first slot of frame 310 (e.g., the first slot of frame 310, the second slot of frame 310, etc.). The UE may then process broadcast signal 335 in one or more slots subsequent to the first slot.

In some cases, broadcast signal 335 may include a primary synchronization signal (PSS) or secondary synchronization signal (SSS). In one example, if a PSS or SSS is transmitted in slot 1 of frame 310, then the UE may use one or more subsequent slots (e.g., at least slot 2) to process the PSS/SSS and determine that the detection of broadcast signal 335 is successful. Thus, in some cases the UE may initiate acquiring RACH resources in slot 3 or slot 4 of frame 310. The processing time may be different for different wireless channels. Accordingly, the UE may initiate a RACH transmission as part of a random access process after processing broadcast signal 335 and before the end of frame 310.

In some cases, the UE may use a physical layer (PHY) to detect broadcast signal 335 from a serving base station. In some examples, there may be no interaction between the PHY and media access control (MAC) layer of the UE. The PHY may detect broadcast signal 335, but may not indicate to the MAC whether frame 310 is available. In some cases, the MAC may select RACH resources of RACH occasion 340 based on an algorithm of the MAC. In some cases, the MAC may not wait for acknowledgment from the PHY whether frame 310 is available or not. In one example, after selecting RACH resources of RACH occasion 340, the MAC may indicate the selected RACH resources to the PHY for PRACH transmission. After selecting RACH resources of RACH occasion 340 or indicating the selected RACH resources to the PHY, the PHY may validate whether frame 310 is available for transmission or not (e.g., validate the RACH resources provided by the MAC) based on information in broadcast signal 335. In some cases, if frame 310 is available, then the PHY may transmit on PRACH. However, if frame 310 is not available, then the PHY may treat the unavailability of resources as a listen before talk (LBT) uplink failure. In some cases, the PHY may monitor for downlink signals (e.g., broadcast signal 335). When the PHY detects broadcast signal 335 in frame 310, the PHY may indicate broadcast signal 335 to the MAC layer. Based on this indication, the MAC layer may select the RACH resources of RACH occasion 340 within frame 310 and the MAC may indicate the selected RACH resources to the PHY for PRACH transmission.

Figure 4:
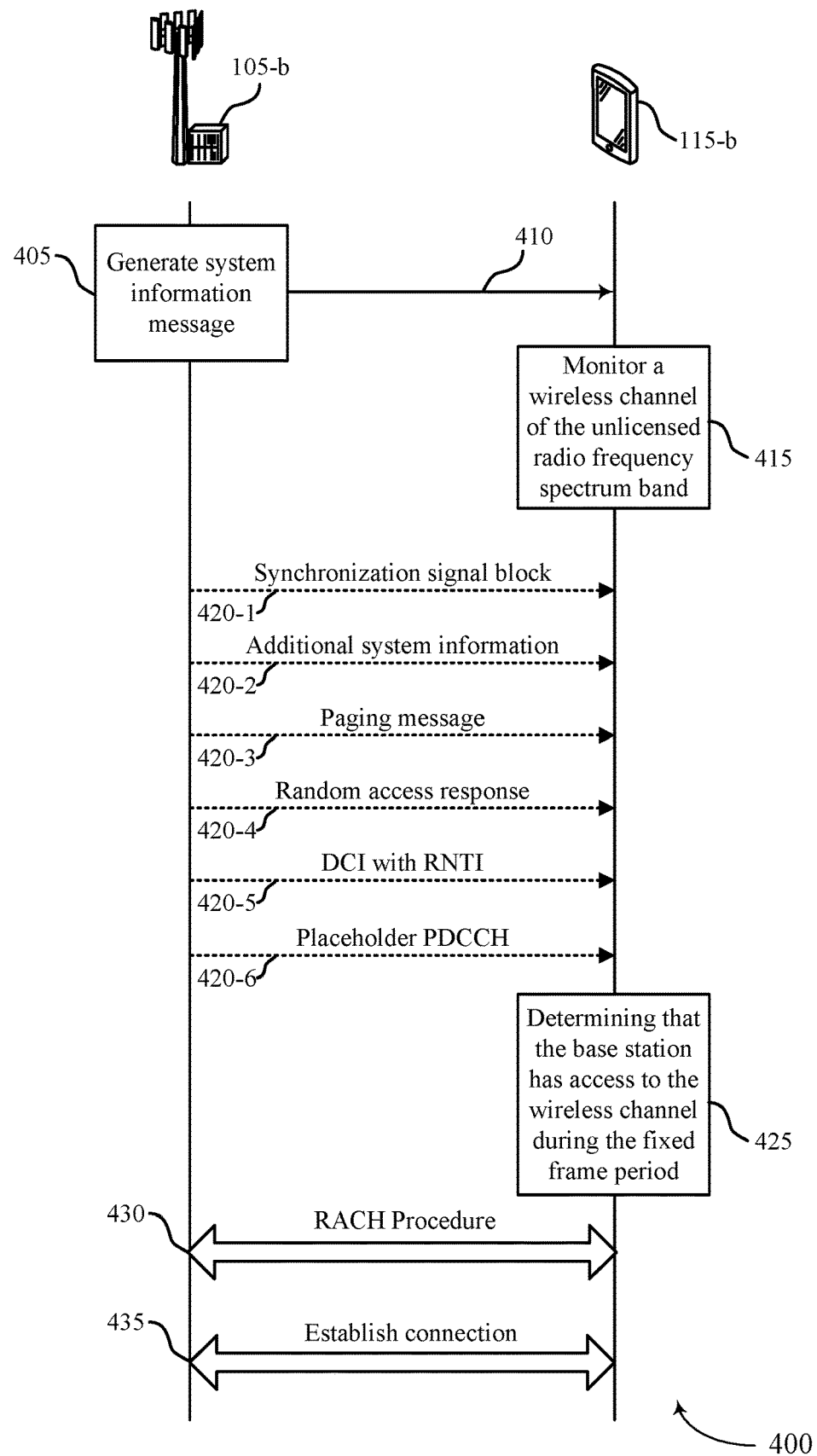
FIG. 4 illustrates an example of a wireless communication subsystem that supports random access channel transmissions using resources associated with a fixed frame period in accordance with aspects of the present disclosure.

FIG. 4 illustrates an example of a wireless communication subsystem 400 that supports random access channel transmissions using resources associated with a fixed frame period in accordance with aspects of the present disclosure. In some examples, wireless communication subsystem 400 may implement aspects of wireless communication system 100.

At 405, base station 105-*b* may broadcast system information in a broadcast message. At 410, base station 105-*b* may transmit, and UE 115-*b* may receive, the system information broadcast by base station 105-*b* at 405. In some cases, base station 105-*b* may transmit the system information in a broadcast message over an unlicensed radio frequency spectrum band.

At 415, UE 115-*b* may monitor a wireless channel of the unlicensed radio frequency spectrum band. At 420, UE 115-*b* may receive an indication based on the monitoring at 415 that base station 105-*b* has access to the wireless channel monitored by UE 115-*b*. Examples of UE 115-*b* receiving the indication at 420 may include any combination of UE 115-*b* receiving an synchronization signal block (SSB) at 420-1, UE 115-*b* receiving additional system information at 420-2 (e.g., RMSI, SIB), UE 115-*b* receiving a paging message (e.g., PDCCH paging message, PDSCH paging message) at 420-3, UE 115-*b* receiving a random access response at 420-4, UE 115-*b* receiving a DCI that includes RNTI (P-RNTI, RA-RNTI, system information RNTI (SI-RNTI)) at 420-5, or UE 115-*b* receiving a placeholder PDCCH at 420-6, or any combination thereof.

In some cases, if the frame acquired by base station 105-*b* includes an SSB transmission (e.g., 420-1), then UE 115-*b* may attempt to detect the SSB (e.g. detect PSS/SSS detection or physical broadcast channel (PBCH) demodulation reference signal (DMRS)) to initiate a RACH transmission within the frame or during a fixed frame period of the frame. In some cases, UE 115-*b* may acquire SSB signal strength before initiating a random access channel procedure by performing a RACH transmission. In some cases, a signal strength threshold may be defined which UE 115-*b* may use to determine whether a detected signal (e.g., system information message at 410, system information message in a broadcast, etc.) can be safely assumed to belong to base station 105-*b*.

In some cases, when a frame includes RMSI or another SIB transmission (e.g., 420-2), UE 115-*b* may attempt to receive PDCCH identified by SI-RNTI for initiation of the random access procedure by performing a RACH transmission within the frame.

In some cases, a random access procedure may be initiated during a fixed frame period of the frame based on UE 115-*b* detecting a PDCCH and/or PDSCH paging message (e.g., 420-3) within the frame. In some cases, UE 115-*b* may trigger PRACH (for connection setup) after UE 115-*b* receives a paging message with its own identity. In some cases, UE 115-*b* may listen for PDCCH on a paging window of UE 115-*b* or another paging window (e.g., a paging window of a different UE).

In one example, UE 115-*b* may receive placeholder physical downlink control channel (PDCCH) from base station 105-*b* and determine that the base station 105-*b* has access to the wireless channel during the fixed frame period based at least in part on receiving the placeholder PDCCH. Examples of the placeholder PDCCH may include an empty PDCCH or "dummy" PDCCH, or an empty RNTI message. In some cases, UE 115-*b* may monitor for control messages that are meant for UE 115-*b* or control message that are meant for UEs other than UE 115-*b*. In some cases, UE 115-*b* may decode these control messages to determine whether base station 105-*b* has gained access to a wireless channel for a particular frame. For example, UE 115-*b* may decode PDCCH transmissions. In some cases, UE 115-*b* may know where to look for PDCCH transmissions based on search space for system information broadcasted by base station 105-*b* (e.g., the system information message UE 115-*b* receives at 410). In some cases, UE 115-*b* may determine where the PDCCH search space should be based on the system information received at 410. In some cases, UE 115-*b* may search this search space to determine whether a transmission from base station 105-*b* indicates that base station 105-*b* has gained access to a particular frame. Accordingly, UE 115-*b* may determine whether UE 115-*b* is enabled to use certain resources (e.g., resources defined by the system information message at 410) during this particular fixed frame period to perform a random access channel procedure.

In some cases, UE 115-*b* may determine where paging PDCCH search space should be based on system information from base station 105-*b* (e.g., system information message broadcasted at 410). In some cases, UE 115-*b* may search this search space to determine whether a transmission from base station 105-*b* indicates that base station 105-*b* has gained access to a particular frame. Accordingly, UE 115-*b* determines it can use other resources (e.g., resources defined by system information message at 410) during this particular frame to perform a random access channel procedure.

In some cases, instead of looking in the resources where UE 115-*b* knows paging PDCCH search space would be, UE 115-*b* may instead analyze the resources indicated in the system information message at 410 that indicate where the RACH resources should be, or where a random access response (RAR) should be, or where PDCCH with a RAR or with RA-RNTI (e.g., DCI with RA-RNTI) should be. Based on this determination, UE 115-*b* may look there and the UE may decode the RAR (e.g., 420-4), PDCCH with RAR, PDCCH with RA-RNTI, DCI with RA-RNTI (e.g., 420-5). Based on the decoded information, UE 115-*b* may use the RACH resources within that same frame that the UE knows are dedicated for uplink RACH transmissions to transmit a RACH request (e.g., RACH message1).

In some cases, the PBCH DMRS may include a cell-specific DMRS signal. In some cases, when UE 115-*b* detects a DMRS signal from base station 105-*b* in a frame, then UE 115-*b* may determine that this frame is occupied by base station 105-*b*. In some cases, UE 115-*b* may determine whether a signal strength of the DMRS signal is greater than a predetermined threshold to determine whether the DMRS signal is from base station 105-*b*.

At 425, UE 115-*b* may determine that base station 105-*b* has access to the wireless channel during the fixed frame period the system information message is sent at 405.

At 430, UE 115-*b* may perform a random access channel (RACH) transmission as part of the random access procedure with base station 105-*b*. In some cases, UE 115-*b* may perform the RACH transmission based at least in part on at least one indication received by UE 115-*b* at 420.

At 435, UE 115-*b* may establish a connection with base station 105-*b* based on the RACH procedure of 430.

Figure 5:
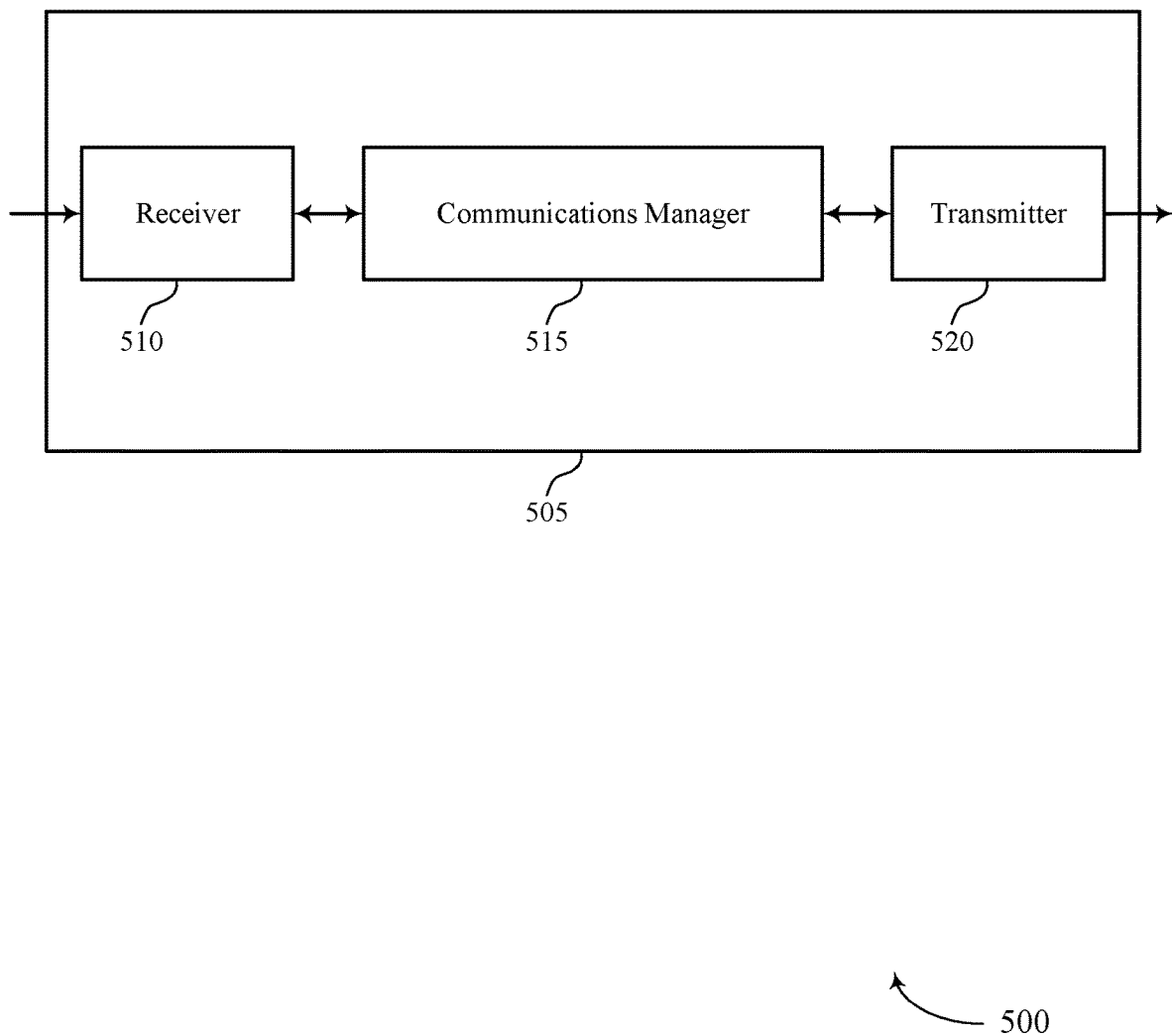
FIGS. 5 and 6 show block diagrams of devices that support random access channel transmissions for frame based equipment systems in accordance with aspects of the present disclosure.

FIG. 5 shows a block diagram 500 of a device 505 that supports random access channel transmissions using resources associated with a fixed frame period in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to random access channel transmissions for frame based equipment systems, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station over an unlicensed radio frequency spectrum band, a broadcast message including system information, the system information indicating a LBT mode of the base station and a set of random access channel resources associated with a fixed frame period, monitor a wireless channel of the unlicensed radio frequency spectrum band during the fixed frame period for control information from the base station based on the indicated LBT mode, determine, based on the monitoring, that the base station has access to the wireless channel during the fixed frame period, and perform, based on the determining, a random access channel transmission as part of a random access procedure during the fixed frame period using the set of random access channel resources. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some cases, the communications manager 515 may be implemented by a chipset of a wireless modem, and the receiver 510 and the transmitter 520 may be implemented by analog or mixed signal components (e.g., antennas, amplifiers, filters, phase shifters, analog to digital converters, digital to analog converters, etc.) connected to the wireless modem. The communications manager 515 may therefore generate messages and output the messages over a transmit interface to the transmitter 520 for transmission. Similarly, the communications manager 515 may obtain received signals from the receiver 510 over a receive interface, and decode and interpret the received signals. The present techniques provide several advantages over conventional systems. For example, the present techniques enable a chipset of a wireless modem to determine when a base station has acquired access to a certain frame. The present techniques enable faster connection attempt to the base station compared to conventional systems at initial access because these techniques enable the chipset of the wireless modem to determine when precisely to attempt performing a random access channel transmission. Also, the present techniques enable the chipset of the wireless modem to improve the conservation of resources compared to conventional systems because the present techniques enable the chipset of the wireless modem to identify a set of random access channel resources associated with a specific frame or a fixed frame period of the frame to which the base station has acquired access and use the identified random access channel resources to perform a random access channel transmission.

Figure 6:
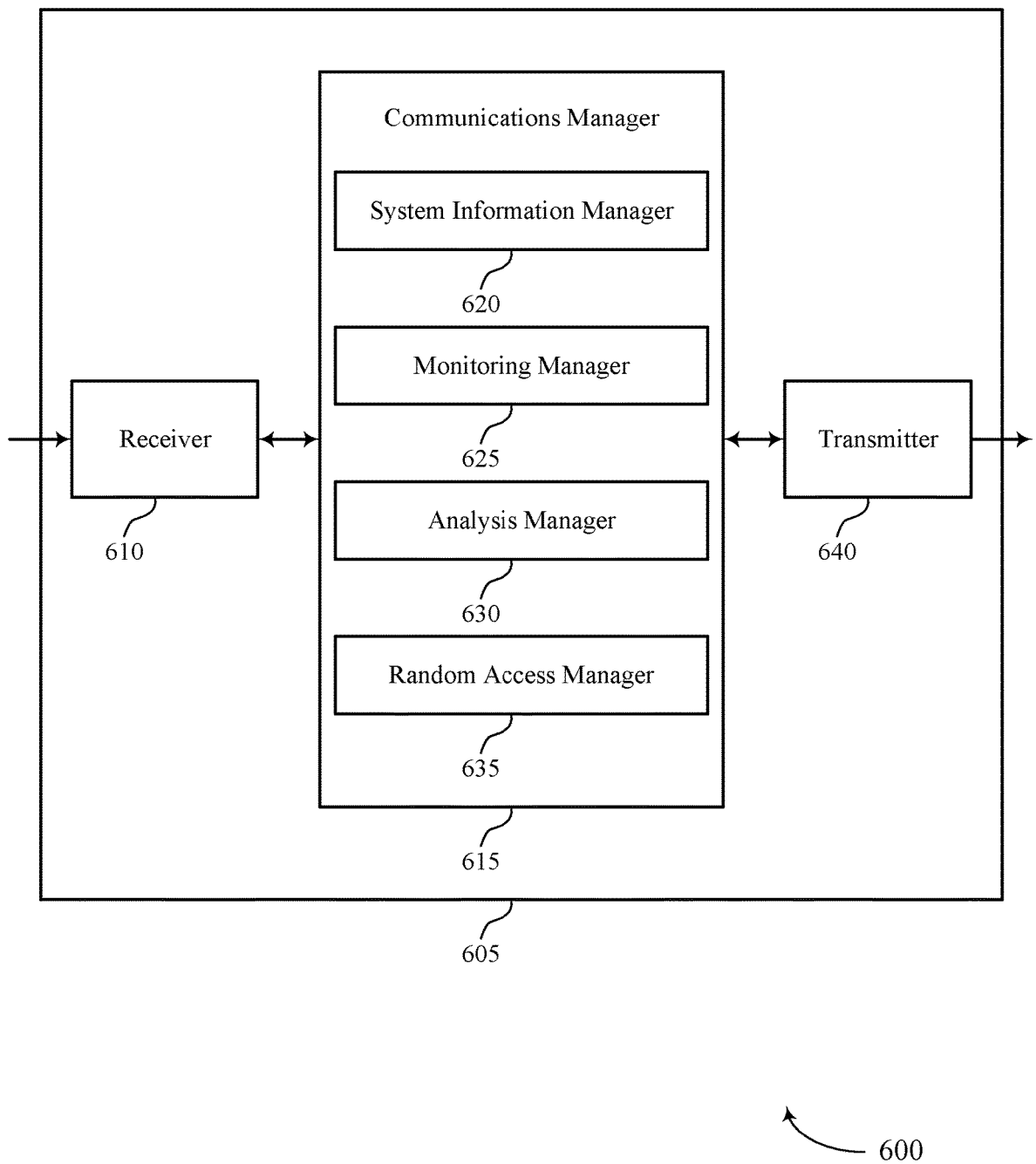

FIG. 6 shows a block diagram 600 of a device 605 that supports random access channel transmissions using resources associated with a fixed frame period in accordance with aspects of the present disclosure. The device 605 may be an example of aspects of a device 505, or a UE 115 as described herein. The device 605 may include a receiver 610, a communications manager 615, and a transmitter 640.

The device 605 may also include a processor. Each of these components may be in communication with one another (e.g., via one or more buses).

The receiver 610 may receive information such as packets, user data, or control information associated with various information channels (e.g., control channels, data channels, and information related to random access channel transmissions for frame based equipment systems, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a system information manager 620, a monitoring manager 625, an analysis manager 630, and a random access manager 635. The communications manager 615 may be an example of aspects of the communications manager 810 described herein.

The system information manager 620 may receive, from a base station over an unlicensed radio frequency spectrum band, a broadcast message including system information, the system information indicating a LBT mode of the base station and a set of random access channel resources associated with a fixed frame period. In some examples, the LBT mode may be or include a FBE mode or semi-static channel access mode.

The monitoring manager 625 may monitor a wireless channel of the unlicensed radio frequency spectrum band during the fixed frame period for control information from the base station based on the indicated LBT mode.

The analysis manager 630 may determine, based on the monitoring, that the base station has access to the wireless channel during the fixed frame period. The random access manager 635 may perform, based on the determining, a random access channel transmission as part of a random access procedure during the fixed frame period using the set of random access channel resources.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
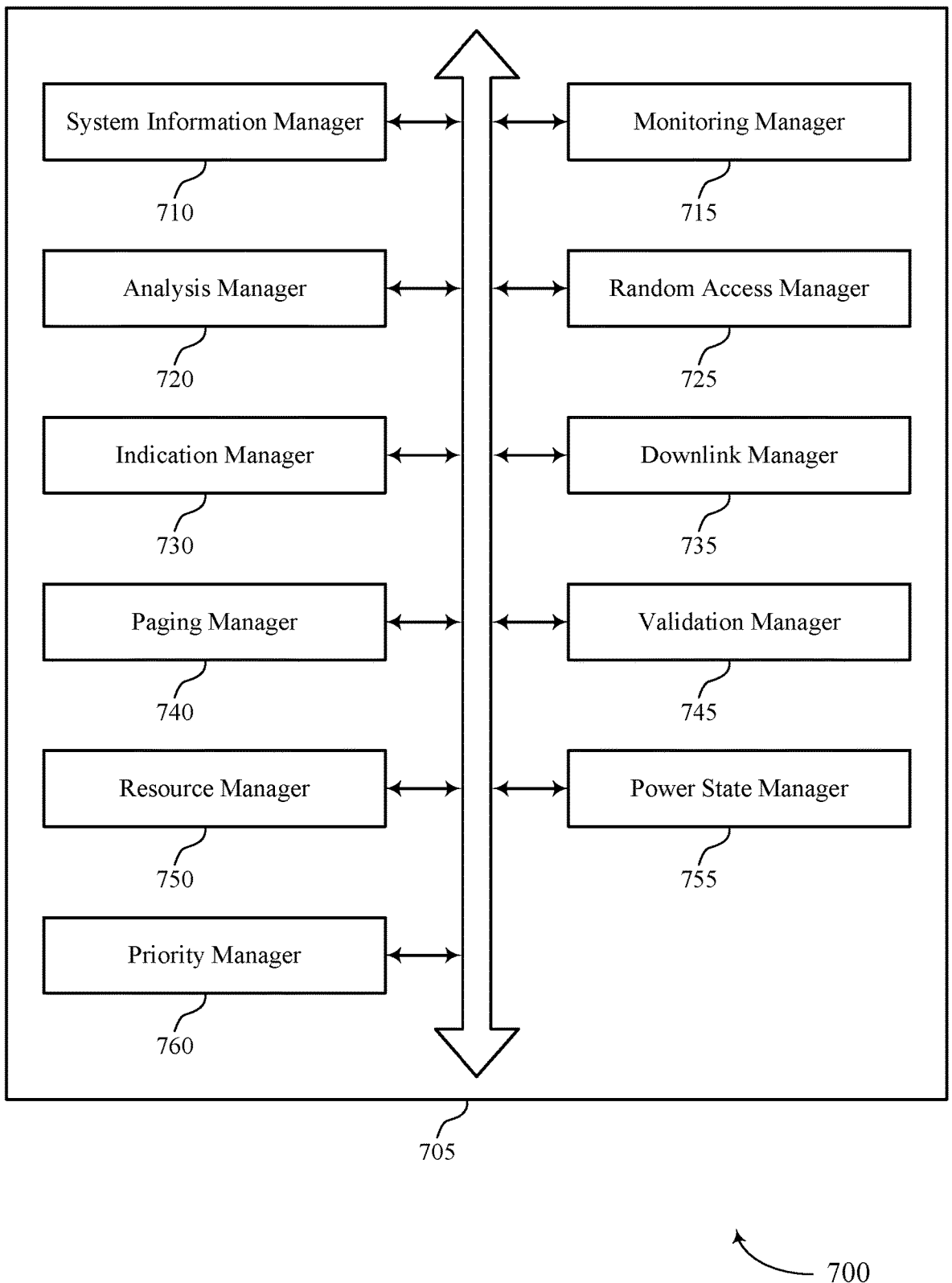
FIG. 7 shows a block diagram of a communications manager that supports random access channel transmissions using resources associated with a fixed frame period in accordance with aspects of the present disclosure.

FIG. 7 shows a block diagram 700 of a communications manager 705 that supports random access channel transmissions using resources associated with a fixed frame period in accordance with aspects of the present disclosure. The communications manager 705 may be an example of aspects of a communications manager 515, a communications manager 615, or a communications manager 810 described herein. The communications manager 705 may include a system information manager 710, a monitoring manager 715, an analysis manager 720, a random access manager 725, an indication manager 730, a downlink manager 735, a paging manager 740, a validation manager 745, a resource manager 750, a power state manager 755, and a priority manager 760. Each of these modules may communicate, directly or indirectly, with one another (e.g., via one or more buses).

The system information manager 710 may receive, from a base station over an unlicensed radio frequency spectrum band, a broadcast message including system information, the system information indicating a LBT mode of the base station and a set of random access channel resources associated with a fixed frame period. In some examples, the LBT mode may be or include a FBE mode or semi-static channel access mode.

The monitoring manager 715 may monitor a wireless channel of the unlicensed radio frequency spectrum band during the fixed frame period for control information from the base station based on the indicated LBT mode.

In some cases, the system information includes a configuration to monitor a group common physical downlink control channel, and where determining the base station is operating in the LBT mode is based on the configuration to monitor the group common physical downlink control channel.

In some cases, the system information includes a configuration to use a category-2 LBT for the random access channel transmission as part of a random access procedure, where determining the base station is operating in the LBT mode is based on the configuration to use category-2 LBT for the random access procedure.

In some cases, the system information includes an indication that the base station is operating in the LBT mode. In some cases, the LBT mode includes a frame based equipment (FBE) LBT mode, and the system information includes a first list of cells operating in the FBE mode and a second list of cells operating in a load based equipment (LBE) mode.

The analysis manager 720 may determine, based on the monitoring, that the base station has access to the wireless channel during the fixed frame period. In some examples, the analysis manager 720 may determine a signal strength of the synchronization signal block transmission, where performing the random access channel transmission is based on the determined signal strength of the synchronization signal block transmission satisfying a threshold.

In some examples, the analysis manager 720 may determine a signal strength of the demodulation reference signal, where performing the random access channel transmission as part of a random access procedure is based on the determined signal strength of the demodulation reference signal satisfying a threshold.

The random access manager 725 may perform, based on the determining, a random access channel transmission as part of a random access procedure during the fixed frame period using the set of random access channel resources.

In some examples, the random access manager 725 may perform the random access channel transmission after the UE processes the broadcast message, where the broadcast message is transmitted in a first slot, and where the UE processes the broadcast message in one or more slots subsequent to the first slot.

The indication manager 730 may receive, based on the monitoring, a synchronization signal block transmission, where determining that the base station has access to the wireless channel is based on the synchronization signal block.

In some examples, the indication manager 730 may receive, based on the monitoring, additional system information during the fixed frame period, where performing the random access channel transmission is based on the additional system information.

In some examples, the indication manager 730 may determine whether the frame of the fixed frame period includes a paging message or a downlink control information including a paging radio network temporary identifier, where performing the random access channel transmission is based on whether the frame includes the paging message or the downlink control information.

In some examples, the indication manager 730 may receive, based on the monitoring, one or more of: a random access response or a downlink control information including a random access radio network temporary identifier, where determining that the base station has access to the wireless channel is based on the random access response or the downlink control information. In some cases, the random access response or the downlink control information is directed to a recipient other than the UE.

In some examples, the indication manager 730 may determine whether the frame of the fixed frame period includes a physical downlink control channel with a placeholder radio network temporary identifier, where performing the random access channel transmission is based on whether the frame includes the physical downlink control channel with the placeholder radio network temporary identifier.

In some examples, the indication manager 730 may detect the physical downlink control channel with the placeholder radio network temporary identifier in a search space of the frame, where the search space of the frame is associated with one or more of: system information or paging.

In some examples, the indication manager 730 may determine whether the frame of the fixed frame period includes a demodulation reference signal, where performing the random access channel transmission is based on whether the frame includes the demodulation reference signal.

In some examples, the indication manager 730 may receive an authentication management message associated with a registration procedure, where determining the base station is operating in the LBT mode is based at least in part the authentication management message.

The downlink manager 735 may receive a downlink grant based on a system information radio network temporary identifier associated with the additional system information, where performing the random access channel transmission is based on the downlink grant.

The paging manager 740 may identify a paging window based on one or more of: an identifier of the UE or an identifier of the base station, where receiving the paging message or the downlink control information is based on the paging window.

The validation manager 745 may determine a validity of resources associated with the random access channel transmission based on a duration associated with the fixed frame period. In some examples, the validation manager 745 may determine, via the physical layer, a validity of the selected resources, where performing the random access channel transmission is based on the determined validity of the selected resources.

In some examples, the validation manager 745 may indicate an LBT failure to the media access control layer when the selected resources are determined to be invalid. In some examples, the validation manager 745 may determine, based on the broadcast message and the fixed frame period, a validity of the random access channel resources, where performing the random access channel procedure is based on the validity of the random access channel resources. In some examples, the validation manager 745 may send an indication of the validity of the random access channel resources from a physical layer of the UE to a media access control layer of the UE.

The resource manager 750 may select, via a media access control layer of the UE, resources available in the fixed frame period for the random access channel transmission. In some examples, the resource manager 750 may indicate, via the media access control layer, the selected resources to a physical layer of the UE, where the UE detects the broadcast message via the physical layer.

The power state manager 755 may enter a low-power state or sleep state based on determining a fixed frame period does not include at least one broadcast message, where the UE treats resources available in the fixed frame period for the random access channel transmission as invalid based on determining the fixed frame period does not include the at least one broadcast message.

The priority manager 760 may apply a cell reselection priority to camp either on the cells operating in FBE mode or on the cells operating in the LBE mode.

Figure 8:
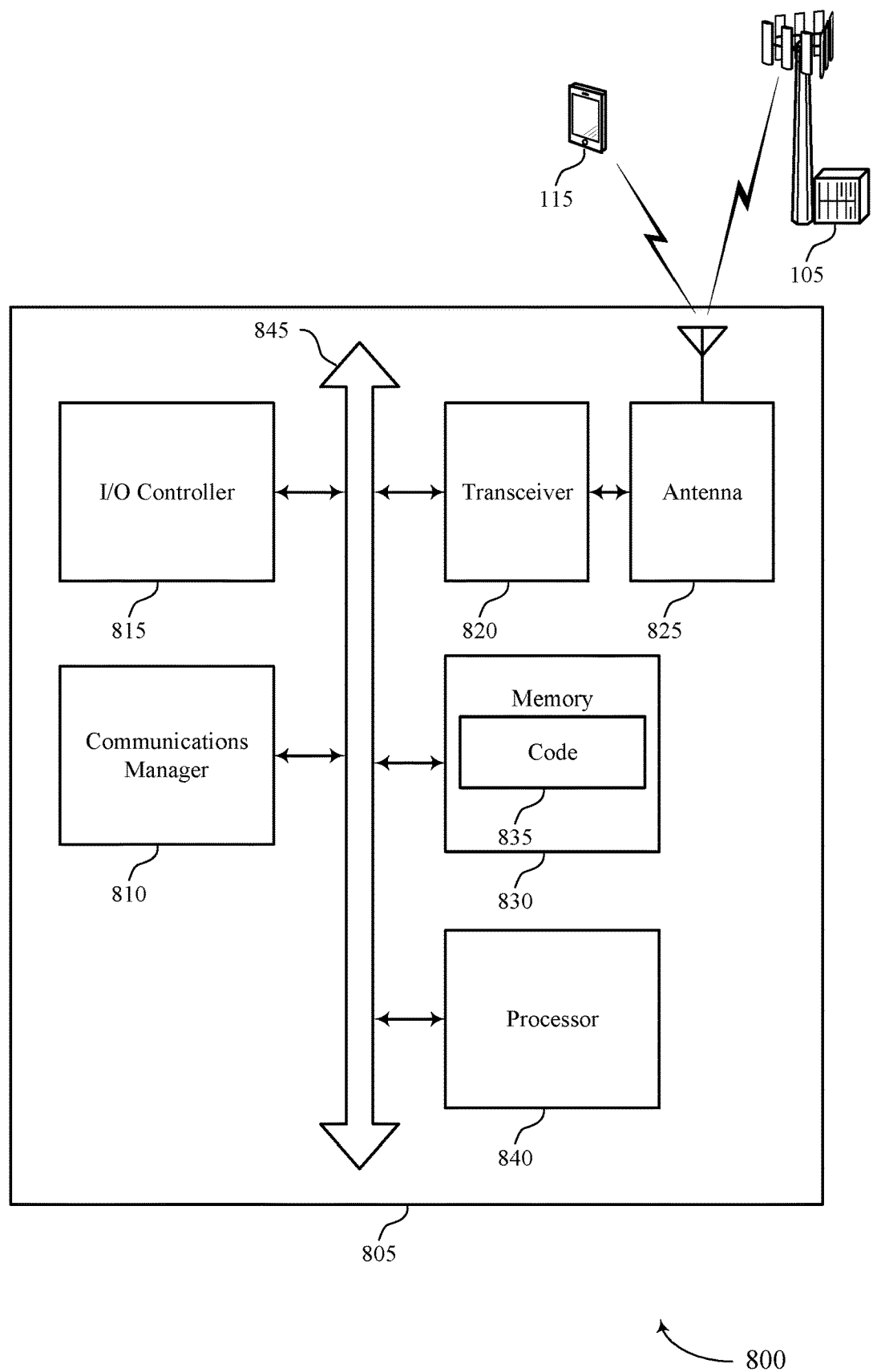
FIG. 8 shows a diagram of a system including a device that supports random access channel transmissions using resources associated with a fixed frame period in accordance with aspects of the present disclosure.

FIG. 8 shows a diagram of a system 800 including a device 805 that supports random access channel transmissions using resources associated with a fixed frame period in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station over an unlicensed radio frequency spectrum band, a broadcast message including system information, the system information indicating a LBT mode of the base station and a set of random access channel resources associated with a fixed frame period, monitor a wireless channel of the unlicensed radio frequency spectrum band during the fixed frame period for control information from the base station based on the indicated LBT mode, determine, based on the monitoring, that the base station has access to the wireless channel during the fixed frame period, and perform, based on the determining, a random access channel transmission as part of a random access procedure during the fixed frame period using the set of random access channel resources.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting random access channel transmissions for frame based equipment systems).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein. The present techniques provide several advantages over conventional systems. For example, by enabling a UE to determine when a base station has acquired access to a certain frame, the present techniques enable improved battery life for a UE compared to conventional systems because these techniques enable the UE to determine when precisely to attempt performing a random access channel transmission. Also, the present techniques provide an improved user experience compared to conventional systems because the present techniques enable the UE to determine a set of random access channel resources associated with a specific frame or a specific fixed frame period of a frame to which the base station has acquired access and use the resources to establish a quicker connection compared to conventional systems.

Figure 9:
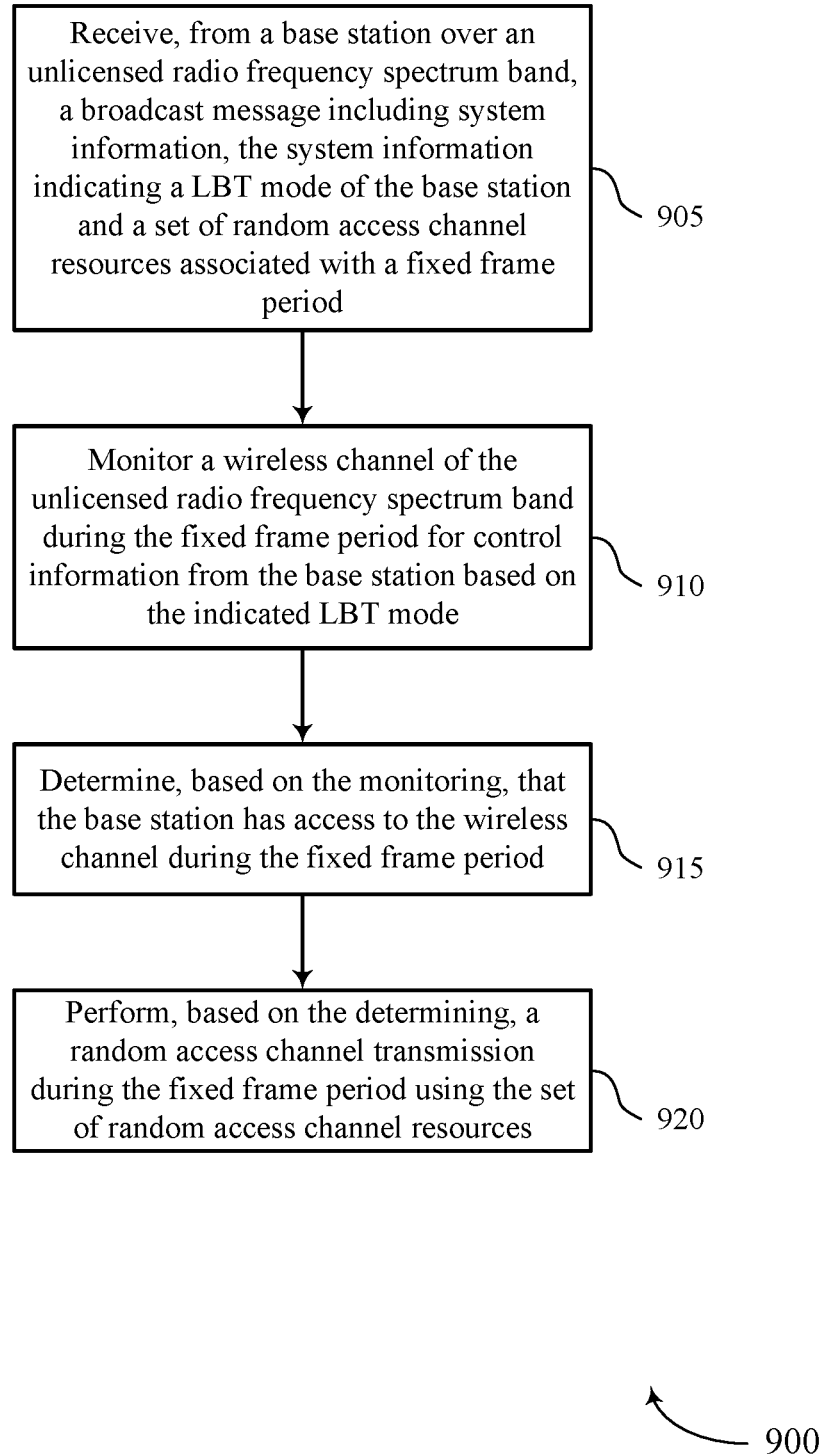
FIGS. 9 through 11 show flowcharts illustrating methods that support random access channel transmissions for frame based equipment systems in accordance with aspects of the present disclosure.

FIG. 9 shows a flowchart illustrating a method 900 that supports random access channel transmissions using resources associated with a fixed frame period in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 905, the UE may receive, from a base station over an unlicensed radio frequency spectrum band, a broadcast message including system information, the system information indicating a LBT mode of the base station and a set of random access channel resources associated with a fixed frame period. The operations of 905 may be performed according to the methods described herein. In some examples, aspects of the operations of 905 may be performed by a system information manager as described with reference to FIGS. 5 through 8.

At 910, the UE may monitor a wireless channel of the unlicensed radio frequency spectrum band during the fixed frame period for control information from the base station based on the indicated LBT mode. The operations of 910 may be performed according to the methods described herein. In some examples, aspects of the operations of 910 may be performed by a monitoring manager as described with reference to FIGS. 5 through 8.

At 915, the UE may determine, based on the monitoring, that the base station has access to the wireless channel during the fixed frame period. The operations of 915 may be performed according to the methods described herein. In some examples, aspects of the operations of 915 may be performed by an analysis manager as described with reference to FIGS. 5 through 8.

At 920, the UE may perform, based on the determining, a random access channel transmission during the fixed frame period using the set of random access channel resources. The operations of 920 may be performed according to the methods described herein. In some examples, aspects of the operations of 920 may be performed by a random access manager as described with reference to FIGS. 5 through 8.

Figure 10:
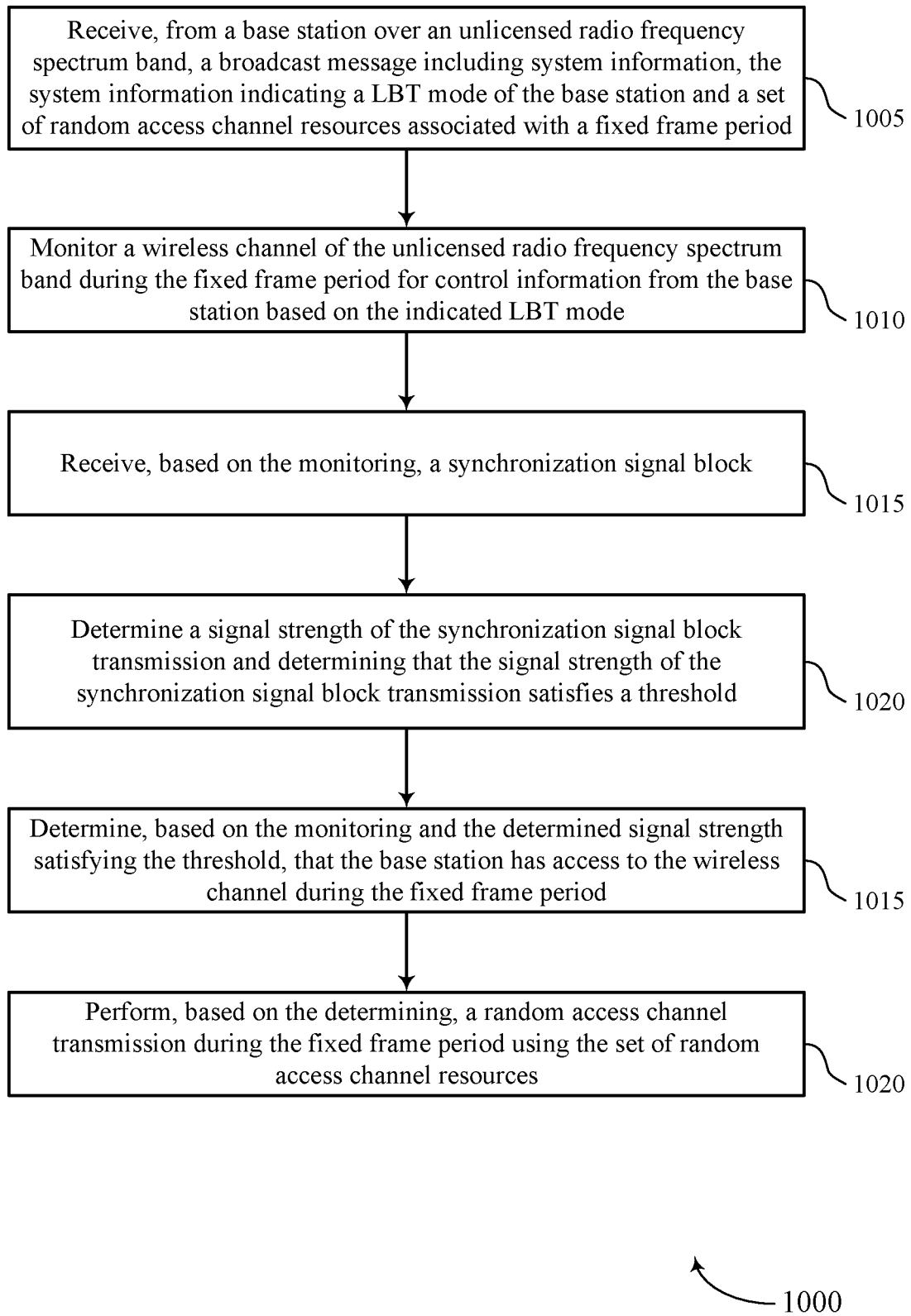

FIG. 10 shows a flowchart illustrating a method 1000 that supports random access channel transmissions using resources associated with a fixed frame period in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1005, the UE may receive, from a base station over an unlicensed radio frequency spectrum band, a broadcast message including system information, the system information indicating a LBT mode of the base station and a set of random access channel resources associated with a fixed frame period. The operations of 1005 may be performed according to the methods described herein. In some examples, aspects of the operations of 1005 may be performed by a system information manager as described with reference to FIGS. 5 through 8.

At 1010, the UE may monitor a wireless channel of the unlicensed radio frequency spectrum band during the fixed frame period for control information from the base station based on the indicated LBT mode. The operations of 1010 may be performed according to the methods described herein. In some examples, aspects of the operations of 1010 may be performed by a monitoring manager as described with reference to FIGS. 5 through 8.

At 1015, the UE may receive, based on the monitoring, a synchronization signal block transmission. In some cases, determining that the base station has access to the wireless channel is based on the synchronization signal block (SSB). The operations of 1015 may be performed according to the methods described herein. In some examples, aspects of the operations of 1015 may be performed by an indication manager as described with reference to FIGS. 5 through 8.

At 1020, the UE may determine a signal strength of the synchronization signal block transmission and determine that the determined signal strength of the synchronization signal block transmission satisfies a threshold. In some cases, performing the random access channel transmission as part of a random access procedure is based on the determined signal strength of the synchronization signal block transmission satisfying the threshold. The operations of 1020 may be performed according to the methods described herein. In some examples, aspects of the operations of 1020 may be performed by an analysis manager as described with reference to FIGS. 5 through 8.

At 1025, the UE may determine, based on the monitoring and the determined signal strength satisfying the threshold, that the base station has access to the wireless channel during the fixed frame period. The operations of 1025 may be performed according to the methods described herein. In some examples, aspects of the operations of 1025 may be performed by an analysis manager as described with reference to FIGS. 5 through 8.

At 1030, the UE may perform, based on the determining the base station has access to the wireless channel, a random access channel transmission as part of a random access procedure during the fixed frame period using the set of random access channel resources. The operations of 1030 may be performed according to the methods described herein. In some examples, aspects of the operations of 1030 may be performed by a random access manager as described with reference to FIGS. 5 through 8.

Figure 11:
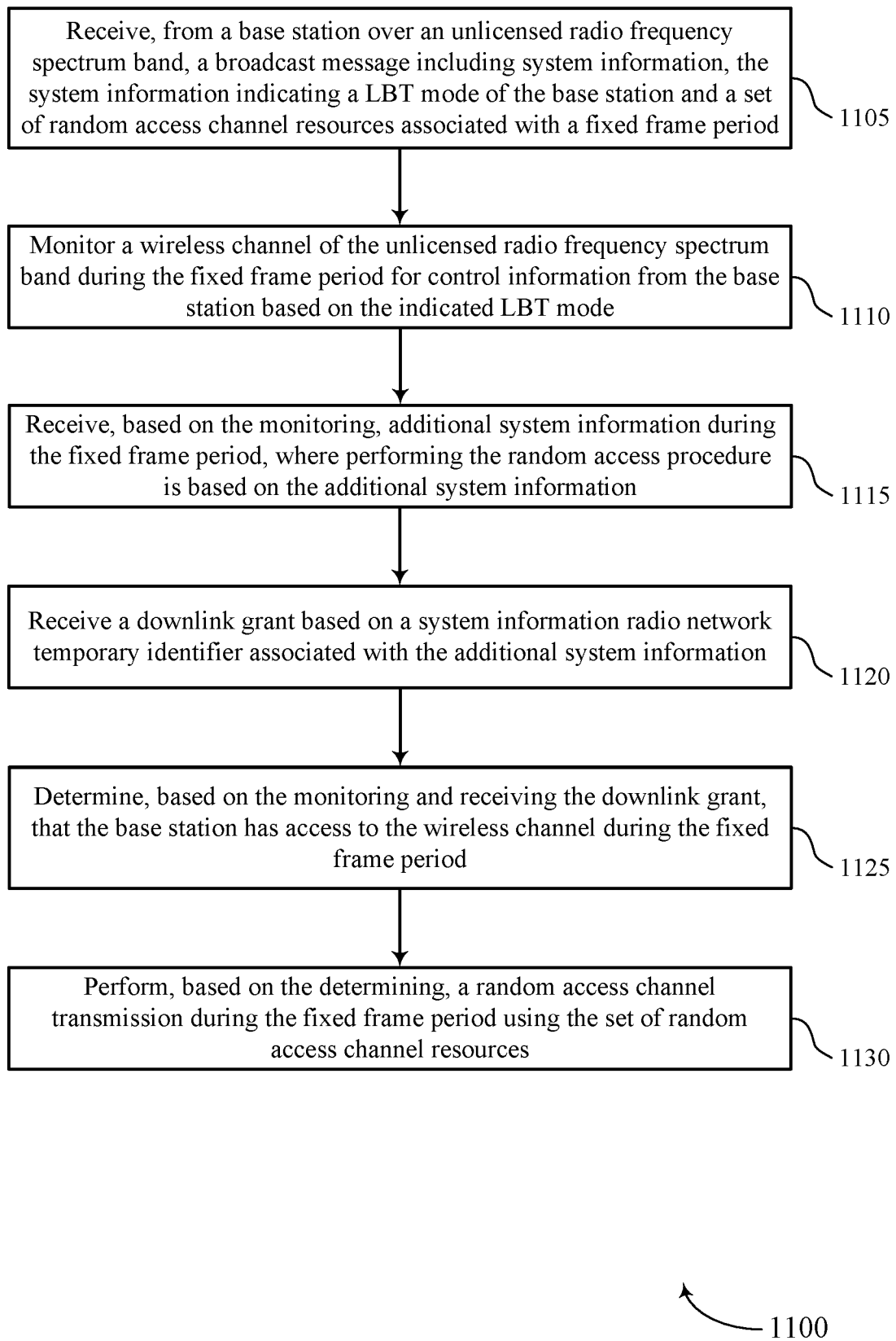

FIG. 11 shows a flowchart illustrating a method 1100 that supports random access channel transmissions for fixed frame period based equipment systems in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1105, the UE may receive, from a base station over an unlicensed radio frequency spectrum band, a broadcast message including system information, the system information indicating a LBT mode of the base station and a set of random access channel resources associated with a fixed frame period. In some examples, the LBT mode may be or include a FBE mode or semi-static channel access mode. The operations of 1105 may be performed according to the methods described herein. In some examples, aspects of the operations of 1105 may be performed by a system information manager as described with reference to FIGS. 5 through 8.

At 1110, the UE may monitor a wireless channel of the unlicensed radio frequency spectrum band during the fixed frame period for control information from the base station based on the indicated LBT mode. The operations of 1110 may be performed according to the methods described herein. In some examples, aspects of the operations of 1110 may be performed by a monitoring manager as described with reference to FIGS. 5 through 8.

At 1115, the UE may receive, based on the monitoring, additional system information (e.g., remaining minimum system information (RMSI) or other system information blocks (SIBs)) during the fixed frame period, where performing the random access channel transmission is based on the additional system information. The operations of 1115 may be performed according to the methods described herein. In some examples, aspects of the operations of 1115 may be performed by an indication manager as described with reference to FIGS. 5 through 8.

At 1120, the UE may receive a downlink grant based on a system information radio network temporary identifier (SI-RNTI) associated with the additional system information For example, the UE may receive the downlink grant from the base station in form of downlink control information (DCI) including a CRC field which is scrambled with the associated SI-RNTI. The downlink grant may schedule a broadcast signal transmission of other system information, such as a system information block (SIB) not included in the RMSI (e.g., not SIB1). In some cases, performing the random access channel transmission as part of a random access procedure is based on the downlink grant. The operations of 1120 may be performed according to the methods described herein. In some examples, aspects of the operations of 1120 may be performed by a downlink manager as described with reference to FIGS. 5 through 8.

At 1125, the UE may determine, based on the monitoring and receiving the downlink grant, that the base station has access to the wireless channel during the fixed frame period. The operations of 1125 may be performed according to the methods described herein. In some examples, aspects of the operations of 1125 may be performed by an analysis manager as described with reference to FIGS. 5 through 8.

At 1130, the UE may perform, based on the determining the base station has access to the wireless channel, a random access channel transmission as part of a random access procedure during the fixed frame period using the set of random access channel resources. The operations of 1130 may be performed according to the methods described herein. In some examples, aspects of the operations of 1130 may be performed by a random access manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a first user equipment (UE), comprising:
   receiving, from a network device over an unlicensed radio frequency spectrum band, a broadcast message comprising system information, the system information indicating a listen-before-talk (LBT) mode of the network device and a set of random access channel resources associated with a fixed frame period;
   monitoring a wireless channel of the unlicensed radio frequency spectrum band during the fixed frame period for control information from the network device based at least in part on the indicated LBT mode;
   determining, based at least in part on the monitoring, that the network device has access to the wireless channel during the fixed frame period; and
   performing, based at least in part on the determining, a random access channel transmission during the fixed frame period using the set of random access channel resources associated with the fixed frame period, wherein a validity of the set of random access channel resources is based at least in part on a duration associated with a frame of the fixed frame period.

2. The method of claim 1, further comprising:
   receiving, based at least in part on the monitoring, a synchronization signal block transmission during the fixed frame period, wherein determining that the network device has access to the wireless channel is based at least in part on the synchronization signal block transmission.

3. The method of claim 2, further comprising:
   determining a signal strength of the synchronization signal block transmission, wherein performing the random access channel transmission is based at least in part on the determined signal strength of the synchronization signal block transmission satisfying a threshold.

4. The method of claim 1, further comprising:
   receiving, based at least in part on the monitoring, additional system information during the fixed frame period, wherein performing the random access channel transmission is based at least in part on the additional system information.

5. The method of claim 4, further comprising:
   receiving a downlink grant based at least in part on a system information radio network temporary identifier associated with the additional system information, wherein performing the random access channel transmission is based at least in part on the downlink grant.

6. The method of claim 1, further comprising:
   determining whether a frame of the fixed frame period includes a paging message or a downlink control information comprising a paging radio network temporary identifier, wherein performing the random access channel transmission is based at least in part on whether the frame includes the paging message or the downlink control information.

7. The method of claim 1, further comprising:
   receiving, based at least in part on the monitoring, one or more of: a random access response or a downlink control information comprising a random access radio network temporary identifier, wherein determining that the network device has access to the wireless channel is based at least in part on the random access response or the downlink control information.

8. The method of claim 7, wherein the random access response or the downlink control information is directed to a recipient other than the UE.

9. The method of claim 1, further comprising:
   determining whether a frame of the fixed frame period includes a physical downlink control channel with a placeholder radio network temporary identifier, wherein performing the random access channel transmission is based at least in part on whether the frame includes the physical downlink control channel with the placeholder radio network temporary identifier.

10. The method of claim 9, wherein the monitoring further comprises:
    detecting the physical downlink control channel with the placeholder radio network temporary identifier in a search space of a frame of the fixed frame period, wherein the search space of the frame comprises one or more of: a system information search space or a paging search space.

11. The method of claim 1, further comprising:
    determining whether a frame of the fixed frame period includes a demodulation reference signal, wherein performing the random access channel transmission is based at least in part on whether the frame includes the demodulation reference signal.

12. The method of claim 11, further comprising:
    determining a signal strength of the demodulation reference signal, wherein performing the random access channel transmission is based at least in part on the determined signal strength of the demodulation reference signal satisfying a threshold.

13. The method of claim 1, further comprising:
    entering a low-power state or sleep state based at least in part on determining a frame of the fixed frame period does not include at least one broadcast signal, wherein the UE treats resources available in the frame for the random access channel transmission as invalid based at least in part on determining the frame does not include the at least one broadcast signal.

14. The method of claim 1, wherein the system information comprises an indication that the network device is operating in the LBT mode.

15. The method of claim 1, wherein the LBT mode comprises a frame based equipment (FBE) LBT mode, and the system information comprises a first list of cells operating in the FBE mode and a second list of cells operating in a load based equipment (LBE) mode.

16. The method of claim 15, further comprising:
    applying a cell reselection priority to camp either on the cells operating in the FBE mode or on the cells operating in the LBE mode.

17. An apparatus for wireless communications by a first user equipment (UE), comprising:
    a processor;
    memory coupled with the processor; and instructions stored in the memory and executable by the processor to cause the apparatus to:
  receive, from a network device over an unlicensed radio frequency spectrum band, a broadcast message comprising system information, the system information indicating a listen-before-talk (LBT) mode of the network device and a set of random access channel resources associated with a fixed frame period;
  monitor a wireless channel of the unlicensed radio frequency spectrum band during the fixed frame period for control information from the network device based at least in part on the indicated LBT mode;
  determine, based at least in part on the monitoring, that the network device has access to the wireless channel during the fixed frame period; and
  perform, based at least in part on the determining, a random access channel transmission during the fixed frame period using the set of random access channel resources associated with the fixed frame period, wherein a validity of the set of random access channel resources is based at least in part on a duration associated with a frame of the fixed frame period.

18. The apparatus of claim 17, wherein the instructions are further executable by the processor to cause the apparatus to:
  receive, based at least in part on the monitoring, a synchronization signal block transmission during the fixed frame period, wherein determining that the network device has access to the wireless channel is based at least in part on the synchronization signal block transmission.

19. The apparatus of claim 18, wherein the instructions are further executable by the processor to cause the apparatus to:
  determine a signal strength of the synchronization signal block transmission, wherein performing the random access channel transmission is based at least in part on the determined signal strength of the synchronization signal block transmission satisfying a threshold.

20. The apparatus of claim 17, wherein the instructions are further executable by the processor to cause the apparatus to:
  receive, based at least in part on the monitoring, additional system information during the fixed frame period, wherein performing the random access channel transmission is based at least in part on the additional system information.

21. The apparatus of claim 20, wherein the instructions are further executable by the processor to cause the apparatus to:
  receive a downlink grant based at least in part on a system information radio network temporary identifier associated with the additional system information, wherein performing the random access channel transmission is based at least in part on the downlink grant.

22. The apparatus of claim 17, wherein the instructions are further executable by the processor to cause the apparatus to:
  determine whether the frame includes a paging message or a downlink control information comprising a paging radio network temporary identifier, wherein performing the random access channel transmission is based at least in part on whether the frame includes the paging message or the downlink control information.

23. The apparatus of claim 17, wherein the instructions are further executable by the processor to cause the apparatus to:
  receive, based at least in part on the monitoring, one or more of: a random access response or a downlink control information comprising a random access radio network temporary identifier, wherein determining that the network device has access to the wireless channel is based at least in part on the random access response or the downlink control information.

24. The apparatus of claim 23, wherein the random access response or the downlink control information is directed to a recipient other than the UE.

25. The apparatus of claim 17, wherein the instructions are further executable by the processor to cause the apparatus to:
  determine whether the frame includes a physical downlink control channel with a placeholder radio network temporary identifier, wherein performing the random access channel transmission is based at least in part on whether the frame includes the physical downlink control channel with the placeholder radio network temporary identifier.

26. An apparatus for wireless communications by a first user equipment (UE), comprising:
  means for receiving, from a network device over an unlicensed radio frequency spectrum band, a broadcast message comprising system information, the system information indicating a listen-before-talk (LBT) mode of the network device and a set of random access channel resources associated with a fixed frame period;
  means for monitoring a wireless channel of the unlicensed radio frequency spectrum band during the fixed frame period for control information from the network device based at least in part on the indicated LBT mode;
  means for determining, based at least in part on the monitoring, that the network device has access to the wireless channel during the fixed frame period; and
  means for performing, based at least in part on the determining, a random access channel transmission during the fixed frame period using the set of random access channel resources associated with the fixed frame period, wherein a validity of the set of random access channel resources is based at least in part on a duration associated with a frame of the fixed frame period.

27. The apparatus of claim 26, further comprising:
  means for receiving, based at least in part on the monitoring, a synchronization signal block transmission during the fixed frame period, wherein determining that the network device has access to the wireless channel is based at least in part on the synchronization signal block transmission.

28. A non-transitory computer-readable medium storing code for wireless communications by a first user equipment (UE), the code comprising instructions executable by a processor to:
  receive, from a network device over an unlicensed radio frequency spectrum band, a broadcast message comprising system information, the system information indicating a listen-before-talk (LBT) mode of the network device and a set of random access channel resources associated with a fixed frame period;
  monitor a wireless channel of the unlicensed radio frequency spectrum band during the fixed frame period for control information from the network device based at least in part on the indicated LBT mode;

determine, based at least in part on the monitoring, that the network device has access to the wireless channel during the fixed frame period; and perform, based at least in part on the determining, a random access channel transmission during the fixed frame period using the set of random access channel resources associated with the fixed frame period, wherein a validity of the set of random access channel resources is based at least in part on a duration associated with a frame of the fixed frame period.

29. The non-transitory computer-readable medium of claim 28, wherein the instructions are further executable to:

receive, based at least in part on the monitoring, a synchronization signal block transmission, wherein determining that the network device has access to the wireless channel is based at least in part on the synchronization signal block transmission.

30. The non-transitory computer-readable medium of claim 29, wherein the instructions are further executable to:

determine a signal strength of the synchronization signal block transmission, wherein performing the random access channel transmission is based at least in part on the determined signal strength of the synchronization signal block transmission satisfying a threshold.

\* \* \* \* \*